(12) United States Patent
MacAdam et al.

(10) Patent No.: US 7,817,652 B1
(45) Date of Patent: Oct. 19, 2010

(54) SYSTEM AND METHOD OF CONSTRUCTING DATA PACKETS IN A PACKET SWITCH

(75) Inventors: Angus David Starr MacAdam, Atlanta, GA (US); Justin Preyer, Atlanta, GA (US); Alan Glaser, Suwanee, GA (US)

(73) Assignee: Integrated Device Technology, inc., San Jose, CA (US)

( * ) Notice: Subject to any disclaimer, the term of this patent is extended or adjusted under 35 U.S.C. 154(b) by 732 days.

(21) Appl. No.: 11/383,150

(22) Filed: May 12, 2006

(51) Int. Cl.
*H04J 12/28* (2006.01)

(52) U.S. Cl. ...................................... 370/412; 370/413
(58) Field of Classification Search ........................ None
See application file for complete search history.

(56) References Cited

U.S. PATENT DOCUMENTS

| | | | |
|---|---|---|---|
| 4,473,880 A | 9/1984 | Budde et al. | |
| 4,932,028 A | 6/1990 | Katircioglu et al. | |
| 4,987,529 A | 1/1991 | Craft et al. | |
| 4,991,171 A | 2/1991 | Teraslinna | |
| 5,072,363 A | 12/1991 | Gallagher | |
| 5,229,991 A | 7/1993 | Turner | |
| 5,276,684 A | 1/1994 | Pearson | |
| 5,305,311 A | 4/1994 | Lyles | |
| 5,440,546 A | 8/1995 | Bianchini, Jr. | |
| 5,710,549 A | 1/1998 | Horst et al. | |
| 5,764,927 A | 6/1998 | Murphy et al. | |
| 5,999,981 A | 12/1999 | Willenz | |
| 6,044,085 A | 3/2000 | Horlander | |
| 6,098,110 A | 8/2000 | Witkowski et al. | |
| 6,134,229 A | 10/2000 | Schwaller et al. | |
| 6,377,782 B1 | 4/2002 | Bishop et al. | |
| 6,389,479 B1 | 5/2002 | Boucher et al. | |
| 6,598,179 B1 | 7/2003 | Chirashnya et al. | |
| 6,625,121 B1 | 9/2003 | Lau et al. | |
| 6,633,578 B1 * | 10/2003 | Matsumaru et al. | 370/419 |
| 6,647,449 B1 | 11/2003 | Watts | |
| 6,658,002 B1 * | 12/2003 | Ross et al. | 370/392 |
| 6,661,788 B2 | 12/2003 | Angle et al. | |
| 6,662,339 B1 | 12/2003 | Lanemann et al. | |

(Continued)

FOREIGN PATENT DOCUMENTS

WO    0239667    5/2002

OTHER PUBLICATIONS

"Cisco MDS 9020 Fabric Switch Configuration Guide and Command Reference, Release 2.x," pp. 10-1 through 10-4, Cisco Systems, Inc., Jun. 2005.

(Continued)

*Primary Examiner*—Phirin Sam
(74) *Attorney, Agent, or Firm*—Stanley J. Pawlik; Kenneth Glass; Glass & Associates

(57) ABSTRACT

A packet switch includes a pointer table for mapping locations in an input data buffer to locations in an output data buffer. The processor generates an output data packet based on data portions in the input data buffer and based on the pointer table. The output data buffer stores data portions of the output data packet successively in a sequential order and can output the data portions of the output data packet successively in a sequential order. The pointer table may be configured to reduce the latency or reduce the power consumption of the packet switch.

21 Claims, 12 Drawing Sheets

U.S. PATENT DOCUMENTS

| | | | |
|---|---|---|---|
| 6,675,325 B1 | 1/2004 | Garney et al. | |
| 6,678,279 B1 | 1/2004 | Meredith | |
| 6,804,237 B1 | 10/2004 | Luo | |
| 6,882,649 B1 | 4/2005 | Gura et al. | |
| 6,937,133 B2 | 8/2005 | Johnson et al. | |
| 6,954,463 B1* | 10/2005 | Ma et al. | 370/401 |
| 6,954,811 B2 | 10/2005 | Vishnu | |
| 6,954,812 B2 | 10/2005 | Lavigne | |
| 6,963,576 B1 | 11/2005 | Lee | |
| 6,975,651 B1 | 12/2005 | Ono et al. | |
| 6,988,177 B2* | 1/2006 | Sokol | 711/170 |
| 7,006,501 B1 | 2/2006 | Gura et al. | |
| 7,020,161 B1 | 3/2006 | Eberle et al. | |
| 7,023,840 B2 | 4/2006 | Golla et al. | |
| 7,027,443 B2 | 4/2006 | Nichols | |
| 7,058,789 B2* | 6/2006 | Henderson et al. | 711/220 |
| 7,106,742 B1 | 9/2006 | Frisch et al. | |
| 7,224,671 B2 | 5/2007 | Lee et al. | |
| 7,260,120 B2* | 8/2007 | Kang et al. | 370/535 |
| 7,274,705 B2* | 9/2007 | Chang et al. | 370/413 |
| 7,313,104 B1* | 12/2007 | Kern et al. | 370/310 |
| 2001/0014105 A1 | 8/2001 | Tezuka et al. | |
| 2001/0020266 A1 | 9/2001 | Kojima et al. | |
| 2002/0085550 A1 | 7/2002 | Rhodes | |
| 2002/0141256 A1* | 10/2002 | Barri et al. | 365/200 |
| 2003/0110206 A1 | 6/2003 | Osokine | |
| 2003/0147394 A1 | 8/2003 | Jennings et al. | |
| 2004/0114587 A1* | 6/2004 | Huang et al. | 370/389 |
| 2004/0153835 A1 | 8/2004 | Song et al. | |
| 2004/0179535 A1 | 9/2004 | Bertagna | |
| 2004/0184466 A1 | 9/2004 | Chang et al. | |
| 2004/0258086 A1 | 12/2004 | Kurupati | |
| 2005/0058127 A1* | 3/2005 | Munter et al. | 370/380 |
| 2005/0111434 A1* | 5/2005 | Halen | 370/351 |
| 2005/0138055 A1 | 6/2005 | Handlogten | |
| 2005/0232201 A1 | 10/2005 | Bysted et al. | |
| 2005/0249244 A1 | 11/2005 | McNamara et al. | |
| 2006/0007885 A1 | 1/2006 | Pollack et al. | |
| 2006/0039374 A1* | 2/2006 | Belz et al. | 370/389 |
| 2006/0050738 A1 | 3/2006 | Carr et al. | |
| 2006/0075311 A1 | 4/2006 | Ranjan et al. | |
| 2006/0128436 A1 | 6/2006 | Doi et al. | |
| 2006/0248377 A1 | 11/2006 | Tezcan et al. | |
| 2006/0251069 A1 | 11/2006 | Cathey et al. | |
| 2007/0072646 A1 | 3/2007 | Kuwahara et al. | |
| 2007/0124554 A1 | 5/2007 | Allen et al. | |
| 2007/0242599 A1 | 10/2007 | Gorday et al. | |
| 2008/0056253 A1* | 3/2008 | Minami et al. | 370/389 |
| 2008/0151922 A1* | 6/2008 | Elzur et al. | 370/412 |
| 2008/0219235 A1 | 9/2008 | Ma et al. | |
| 2008/0228871 A1* | 9/2008 | Sano | 709/203 |
| 2008/0275872 A1* | 11/2008 | Venkatachary et al. | 707/5 |
| 2008/0298492 A1 | 12/2008 | Hwang et al. | |

OTHER PUBLICATIONS

Peter J. Welcher, "Configuring SNMP on Switches, and Syslog," Jun. 24, 1999.
"RapidIO Interconnect Specification, Part 8, Error Management, Extensions Specification," RapidIO Trade Association, Jun. 2005.
RapidIO: An Embedded System Component Network Architecture, Feb. 22, 2000, Motorola.
RFC: 791, DARPA Internet Program Protocol Specification, Sep. 1981, Information Science Institute.
802.11 standard, Aug. 21, 2002, http://wlan.nat.sdu.dk/802_11standard.htm.
History of the I2C Bus, Circa 2000, ESAcademy.
International Search Report, PCT/US2006/013767, Jul. 31, 2006.
"Solano Communications IC: A High-Throughput Solution for 3G Wireless and Broadband Base Stations," Spectrum Wireless Systems, Admitted Prior Art, 4 pages.
"Tsi568A: Serial RapidIO Switch," Tundra Semiconductor Corp., Printed From Internet Feb. 17, 2005, 4 pages.
"RapidIO: An Embedded System Component Network Architecture," Architecture and Systems Platforms, Motorola Semiconductor Product Sector, Feb. 22, 2000, 25 pages.
Bertan Tezcan and Bill Beane, "How to achieve low-cost, reusable wireless infrastructure through modular baseband design," Wireless Net DesignLine, Aug. 8, 2006, available at http://www.wirelessnetdesignline.com.
Bertan Tezcan and Bill Beane, "Achieving modular wireless infrastructure design: A compelling look at benefits supporting connectivity amongst DSPs, FPGAs, or ASICs," OpenSystems Publishing, Sep. 22, 2006, available at http://www.dsp-fpga.com/articles/tezcan_and_beane.
Bertan Tezcan and Bill Beane, "Modular baseband design—Enabling a low-cost reusable wireless infrastructure(Part I)," Portable Design Online Article, Feb. 15, 2007, previously available at http://pd.pennnet.com.
Bertan Tezcan and Bill Beane, "Modular baseband design—Enabling a low-cost reusable wireless infrastructure(Part II)," Portable Design Online Article, Feb. 15, 2007, previously available at http://pd.pennnet.com.
Lukas Sekanina and Vladimir Drabek, "Theory and Applications of Evolvable Embedded Systems," Proceedings of the 11th IEEE International Conference and Workshop on the Engineering of Computer-Based Systems (ECBS'04), 2004.

* cited by examiner

SYSTEM AND METHOD OF CONSTRUCTING DATA PACKETS IN A PACKET SWITCH

CROSS-REFERENCE TO RELATED APPLICATIONS

The present application is related to co-pending U.S. patent application Ser. No. 11/395,575, filed Mar. 31, 2006, entitled "Combined Packet Processor and RIO Switch on Single Chip for DSP Clustered Applications," co-pending U.S. patent application Ser. No. 11/394,886, filed Mar. 31, 2006, entitled "Allocating Destination Addresses to a Switch to Perform Packet Processing on Selected Packets with Corresponding Destination Address," co-pending U.S. patent application Ser. No. 11/395,570, filed Mar. 31, 2006, entitled "Performing Packet Manipulation Options to Transform Packet Data to a Format More Compatible with Processor," co-pending U.S. patent application Ser. No. 11/383,121, filed on even date herewith, entitled "Error Management System and Method for a Packet Switch," and co-pending U.S. patent application Ser. No. 11/383,165, filed on even date herewith, entitled "Packet Processing in a Packet Switch with Improved Output Data Distribution," each of which is incorporated herein by reference its entirety.

BACKGROUND

1. Field of the Invention

The present invention generally relates to packet switching networks, and more particularly to processing data packets in a packet switch.

2. Description of Related Art

Modern telecommunication networks include packet switching networks for transmitting data from a source device to a destination device. The data is split up and encapsulated into data packets along with a destination address of the data. The packet switching network individually routes each data packet through a network of interconnected packet switches based on the destination address in the data packet. The data packets may be routed through different paths in the packet switching network and generally arrive at the destination device in an arbitrary order. At the destination device, the data is reconstructed from the data packets.

Latency of the packet switching network may be measured by determining an average time for routing data packets through the packet switching network. The latency of the packet switching network may depend on various factors, including the latency of each individual packet switch in the packet switching network. Generally, a reduction in the latency of the packet switches results in a reduction in the latency of the packet switching network. In addition to reducing the latency of a packet switch, it is often desirable to reduce the power requirements of a packet switch. For instance, it may be desirable to reduce the power requirements of a packet switch contained in a portable device.

In light of the above, a need exists for reducing the latency of a packet switch. A further need exists for reducing the power requirements of a packet switch.

SUMMARY

In various embodiments, a packet switch includes an input data buffer, an output data buffer, a pointer table, and a processor. The input data buffer receives one or more input data packets and stores data portions of the input data packets. The pointer table maps locations in the input data buffer to locations in the output data buffer. The processor accesses the data portions in the input data buffer and generates an output data packet based on the data portions and the pointer table. The output data packet includes a sequence of data portions, which have a sequential order. The output data buffer stores each data portion of the sequence of data portions successively in the sequential order. Additionally, the output data buffer can output each data portion of the sequence of data portions successively in the sequential order. In this way, the output data buffer need not store each data portion of the output data packet before beginning to output the output data packet, which may reduce the latency of the packet switch.

In some embodiments, the packet switch includes a cache memory for storing one or more data portions. The processor can access a data portion in the input data buffer, write the data portion into the cache memory, and then access the data portion in the cache memory instead of the input data buffer. Because accessing the data portion in the cache memory may consume less power than accessing the data portion in the input data buffer, the cache memory may reduce the power requirements of the packet switch.

In some embodiments, the packet switch reads multiple data portions of the input data packets in the input data buffer in a clock cycle to reduce the latency of the packet switch. The packet switch reads the data portions in the input data buffer in subcycles distributed in the clock cycle to avoid a power spike that may be caused by reading the data portions in the input data buffer at the same time. In this way, the latency of the packet switch and the power requirements of the packet switch may be reduced.

A system for processing a data packet, in accordance with one embodiment, includes a first data buffer, a second data buffer, a pointer table, and a processor. The processor is coupled to the first data buffer, the second data buffer, and the pointer table. The first data buffer includes locations for storing data portions of an input data packet, and the second data buffer includes locations for storing data portions of an output data packet. The first data buffer receives at least one input data packet including data portions and stores each data portion into one of the locations of the first data buffer. The processor generates the output data packet based on the data portions in the first data buffer and the pointer table. The output data packet includes a sequence of data portions having a sequential order. The second data buffer stores each data portion of the sequence of data portions successively in the sequential order. In a further embodiment, the second data buffer outputs each data portion of the sequence of data portions successively in the sequential order. The second data buffer can output each data portion of the sequence of data portions in response to receiving the data portion.

A method of processing a data packet, in accordance with one embodiment, includes receiving at least one input data packet and data portions contained therein, and storing the data portions into corresponding locations of a first data buffer. The method further includes mapping the locations of the first data buffer to locations of a second data buffer. Additionally, the method includes generating an output data packet including a sequence of data portions based on the data portions in the first data buffer. The data portions in the sequence of data portions have a sequential order. Further, the method includes storing the sequence of data portions in the second data buffer successively in the sequential order. In a further embodiment, the method includes outputting each data portion of the sequence of data portions successively in the sequential order. The second data buffer can output each data portion of the sequence of data portions in response to receiving the data portion.

A system of processing a data packet, in accordance with one embodiment, includes a means for receiving at least one input data packet and data portions contained therein, and a means for storing the data portions in corresponding locations of a first data buffer. The system further includes a means for mapping the location of the first data buffer to locations of a second data buffer. Additionally, the system includes a means for generating an output data packet based on the data portions in the first data buffer. The output data packet includes a sequence of data portions having a sequential order. Further, the system includes a means for storing each data portion of the sequence of data portions into the second data buffer successively in the sequential order. In a further embodiment, the system includes a means for outputting each data portion of the sequence of data portions successively in the sequential order.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention. In the drawings.

DETAILED DESCRIPTION

In various embodiments, a packet switch receives an input data packet and performs one or more operations on data portions of the input data packet to generate an output data packet. The output data packet includes a sequence of data portions, which have a sequential order. The packet switch generates the data portions of the output data packet successively in the sequential order. Additionally, the packet switch can transmit the data portions of the output data packet successively in the sequential order. The packet switch can begin to transmit the data portions of the output data packet before generating all of the data portions of the output data packet, which may reduce the latency of the packet switch.

Figure 1:
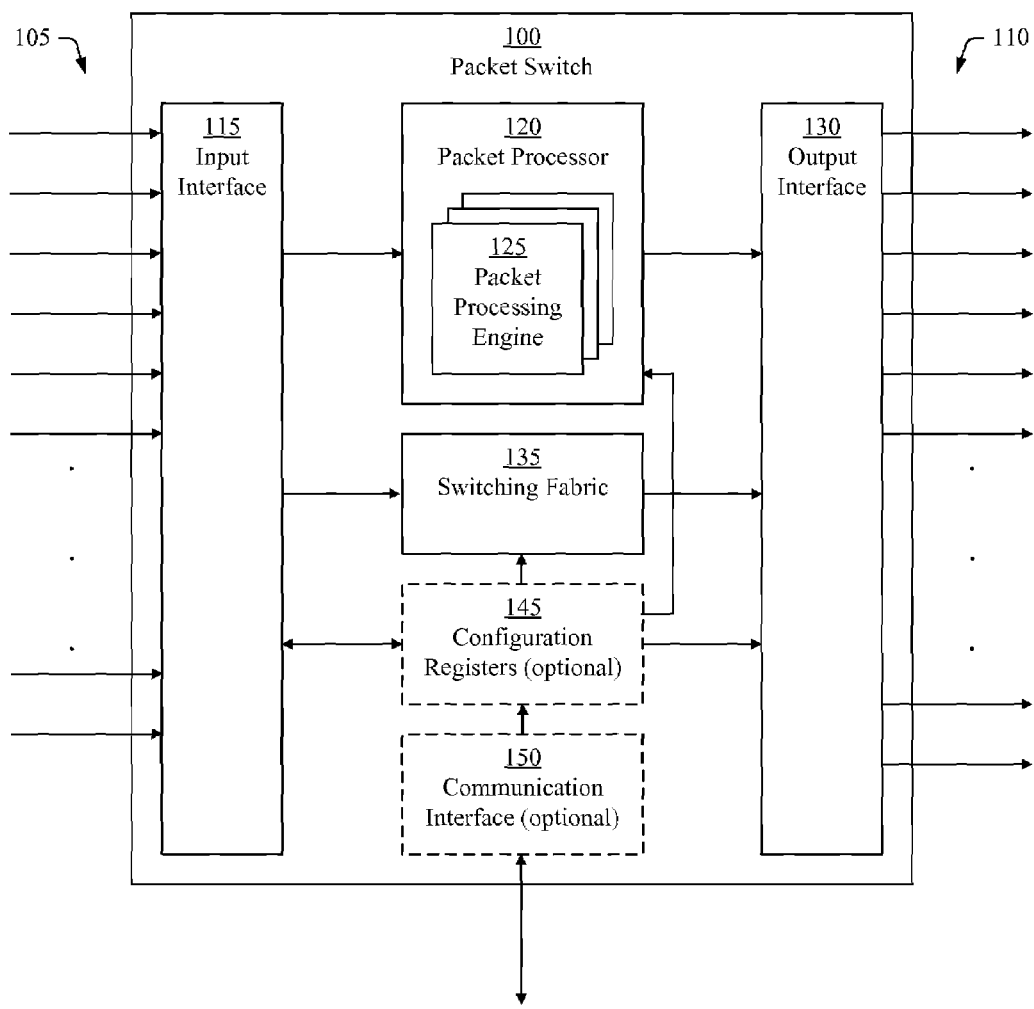
FIG. 1 is a block diagram of a packet switch, in accordance with an embodiment of the present invention.

FIG. 1 illustrates a packet switch 100, in accordance with an embodiment of the present invention. The packet switch 100 includes input ports 105, output ports 110, an input interface 115, an output interface 130, a packet processor 120, and a switching fabric 135. The packet processor 120 and the switching fabric 135 are each coupled to both the input interface 115 and the output interface 130. In one embodiment, the packet switch 100 is implemented in an integrated circuit, which may be packaged as a computer chip.

The input interface 115 receives data packets from external sources of the packet switch 100 at the input ports 105 and individually routes the data packets to the packet processor 120 or the switching fabric 135 based on the content of the data packets. The switching fabric 135 routes data packets received from the input interface 115 to the output interface 130 based on the content of the data packets. The packet processor 120 processes data packets received from the input interface 115 to generate data packets based on the content of the received data packets, and routes the generated data packets to the output interface 130. The input interface 115, the packet processor 120, and the switching fabric 135 can route a data packet, for example, based on a destination identifier in the data packet. The output interface 130 receives data packets from the packet processor 120 and the switching fabric 135 and transmits the data packets to external recipients through the output ports 110.

In various embodiments, the packet processor 120 generates data packets based on data packets received from the input interface 115 and according to one or more packet processing scenarios. The packet processor 120 includes one or more packet processing engines 125 for performing packet processing scenarios on the data packets received from the input interface 115. Each packet processing scenario includes one or more operations to be performed on the data packets received from the input interface 115. The operations of the packet processing scenarios may include operations for manipulating data payloads in the data packets received from the input interface 115. For example, the operations may involve bit extension, bit truncation, bit reordering (e.g., interleaving and/or flipping), or combining (e.g., summing or other arithmetic operations) of data payloads. When used in a signal processing application such as a wireless base station, for example, the packet switch 100 can perform operations on data payloads of the data packets to facilitate baseband processing operations performed downstream of the packet switch 100.

In one embodiment, destination identifiers of the data packets are associated with respective packet processing scenarios. The input interface 115 routes a data packet containing a destination identifier associated with a packet processing scenario to a packet processing engine 125 associated with the packet processing scenario. In turn, the packet processing engine 125 performs the packet processing scenario on the data packet. In this embodiment, the input interface 115 routes data packets containing destination identifiers not associated with a packet processing scenario to the switching fabric 135. In turn, the switching fabric 135 routes the data packets to the output interface 130 based on the destination identifiers of the data packets. Such an approach may be advantageous because any processing of the data packets according to the packet processing scenarios is transparent to the external source and/or the external recipient of the data packets.

In some embodiments, the packet switch 100 may optionally include one or more configuration registers 145. The configuration registers 145 are coupled to components of the packet switch 100, including the input interface 115, the output interface 130, the packet processor 120, and the switching fabric 135. In other embodiments, the configuration registers 145 may be coupled to more or fewer components of the packet switch 100. Further, the packet switch 100 may optionally include a communication interface 150 coupled to the configuration registers 145. The communication interface 150 may be an Inter-Integrated Circuit (I2C) bus interface, a Joint Test Action Group (JTAG) interface, or any other interface that facilitates communication with the packet switch 100.

The configuration registers 145 store configuration data for configuring the packet switch 100. For example, the configuration data may include parameters for defining the function of various components of the packet switch 100. The parameters may define various port configurations, packet processing scenarios, switching functions, communications protocols, and/or messaging formats of the packet switch 100. A user may configure the packet switch 100 by writing configuration data into the configuration registers 145 through the input interface 115 or the communication interface 150.

The configuration registers 145 may include registers to configure speed, timing, and/or other characteristics of the input ports 105 and/or the output ports 110. For example, the configuration registers 145 can be configured to handle long and short haul serial transmission as defined, for example, by a RapidIO™ serial specification, an open standard governed by the RapidIO Trade Association of Austin, Tex. The configuration registers 145 can be configured, for example, during an initialization procedure.

The configuration registers 145 may include registers to configure packet processing scenarios. For example, the configuration registers 145 may define payload formats and operations performed on data payloads of data packets for a packet processing scenario. The packet processing scenarios performed by the packet processing engines 125 may include individual packet processing scenarios or group packet processing scenarios. The packet processor 120 can perform a group packet processing scenario by multicasting data packets to multiple packet processing engines 125. In turn, the packet processing engines 125 can perform packet processing scenarios on the data packets in parallel. Such groupings of individual packet processing scenarios may be configurable, for example, by using the configuration registers 145.

In some embodiments, the input interface 115 has a default (e.g., power-on) configuration to enable communication between the packet switch 100 and an external source. For example, the input interface 115 can receive data packets containing configuration data from an external source and can write the configuration data into the configuration registers 145. In this way, the external source can write configuration data into the configuration registers 145 to configure the packet switch 100.

In various embodiments, the packet switch 100 may be configured to provide packet communications compliant with the RapidIO™ interconnect architecture, an open standard governed by the RapidIO Trade Association of Austin, Tex. The RapidIO™ interconnect architecture includes physical and logical communications specifications for inter-device communications. Although some embodiments described herein relate to RapidIO™ compliant packet switches and operations thereof, the present invention may use other packet communication architectures.

In various embodiments, the packet processor 120 may include a microprocessor, an embedded processor, a microcontroller, a digital signal processor, a logic circuit, software, computing instructions, or any other software or hardware technology for processing data packets. The switching fabric 135 can include any switch, switch interconnect, switching network, software, device, or any hardware or software technology for routing data packets. For example, the switching fabric 135 may include one or more logic circuits interconnected in a switching network.

Figure 2:
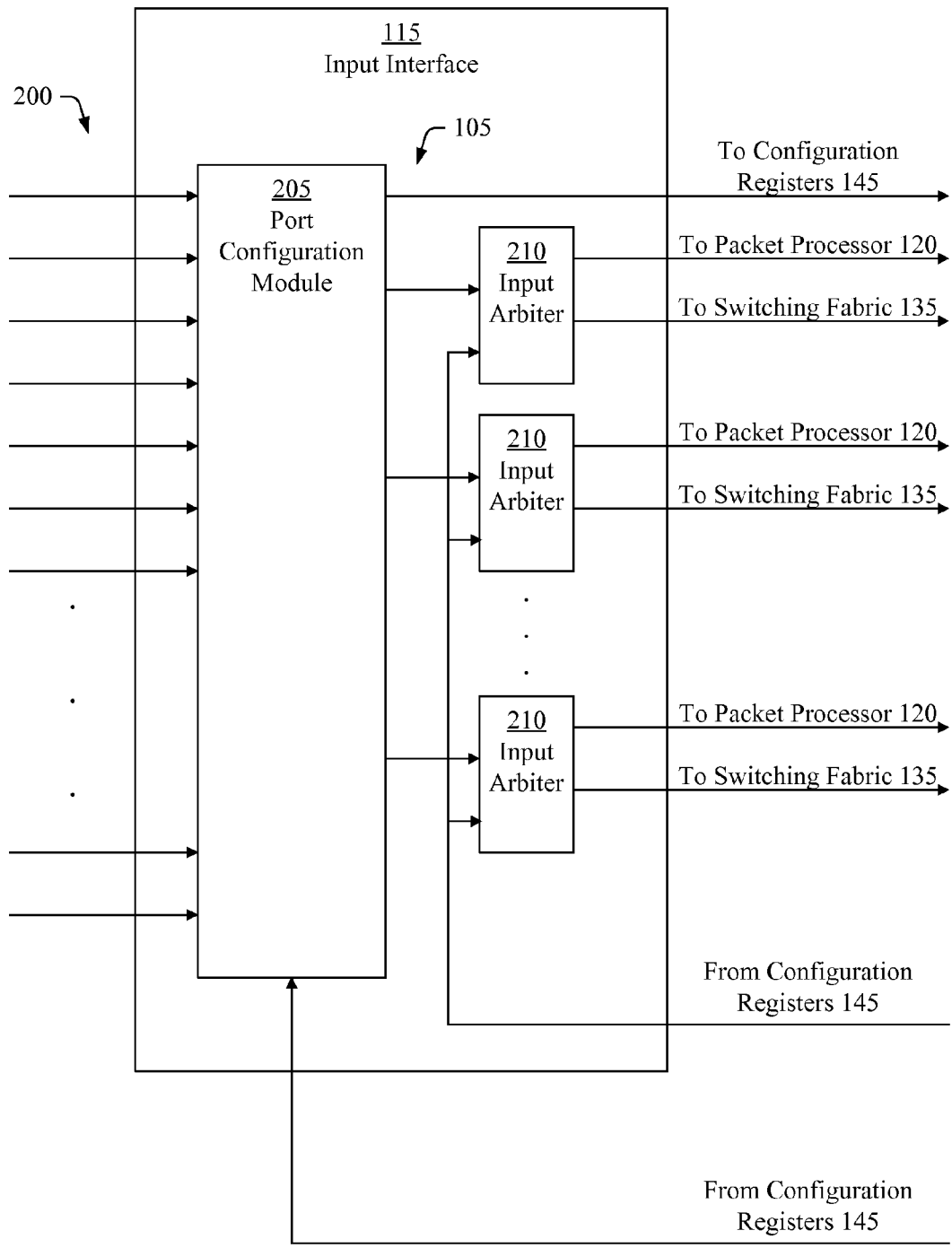
FIG. 2 is a block diagram of an input interface, in accordance with an embodiment of the present invention.

FIG. 2 illustrates the input interface 115, in accordance with an embodiment of the present invention. The input interface 115 includes a port configuration module 205 and input arbiters 210. In this embodiment, the packet switch 100 (FIG. 1) includes input links 200 coupled to the input interface 115, and the input ports 105 are internal of the packet switch 100. The port configuration module 205 is coupled to the input ports 105 and associates at least some of the input links 200 to at least some of the input ports 105. The input arbiters 210 are coupled to and associated with respective input ports 105.

The port configuration module 205 receives a data packet from an external source of the packet switch 100 at an input link 200 and passes the data packet to the input port 105 associated with the input link 200. In turn, the input arbiter 210 routes the data packet to the packet processor 120 (FIG. 1) or the switching fabric 135 (FIG. 1) based on the content of the data packet. In some embodiments, the port configuration module 205 is coupled to the configuration registers 145 (FIG. 1) through one of the input ports 105. In this way, an external source of the packet switch 100 (FIG. 1) can write configuration data into the configuration registers 145.

In various embodiments, the port configuration module 205 or the input arbiters 210, or both, are coupled to the configuration registers 145 (FIG. 1). In these embodiments, the configuration registers 145 can configure the port configuration module 205 or the input arbiters 210. The configuration registers 145 can configure the port configuration module 205 to associate input links 200 to input ports 105. Further, the configuration registers 145 can configure the input arbiters 210 to identify a data packet associated with a packet processing scenario, for example based on a destination identifier in the data packet.

In some embodiments, the port configuration module 205 can associate one input link 200 to one input port 105, or the port configuration module 205 can associate multiple input links 200 to a single input port 105. In one embodiment, the input links 200 are contained in groups of input links 200 and the input ports 105 are contained in groups of input ports 105. For example, each group of input links 200 may include four input links 200, and each group of input ports 105 may include four input ports 105. The port configuration module 205 associates one or more input links 200 in a group of input links 200 with one or more input ports 105 in an associated group of input ports 105. The port configuration module 205 can associate each input link 200 in the group of input links 200 with a respective input port 105 in the group of input ports 105. Instead, the port configuration module 205 can associate one input link 200 in the group of input links 200 with one input port 105 in the group of input ports 105 such that any remaining input link 200 in the group of input links 200 is not associated with an input port 105. Alternatively, the port configuration module 205 can associate all the input links 200 in the group of input links 200 with a single input port 105 in the group of input ports 200 such that any remaining input port 105 in the group of input ports 105 is not associated with an input link 200. Other associations between the group of input links 200 and the group of input ports 105 are possible.

Figure 3:
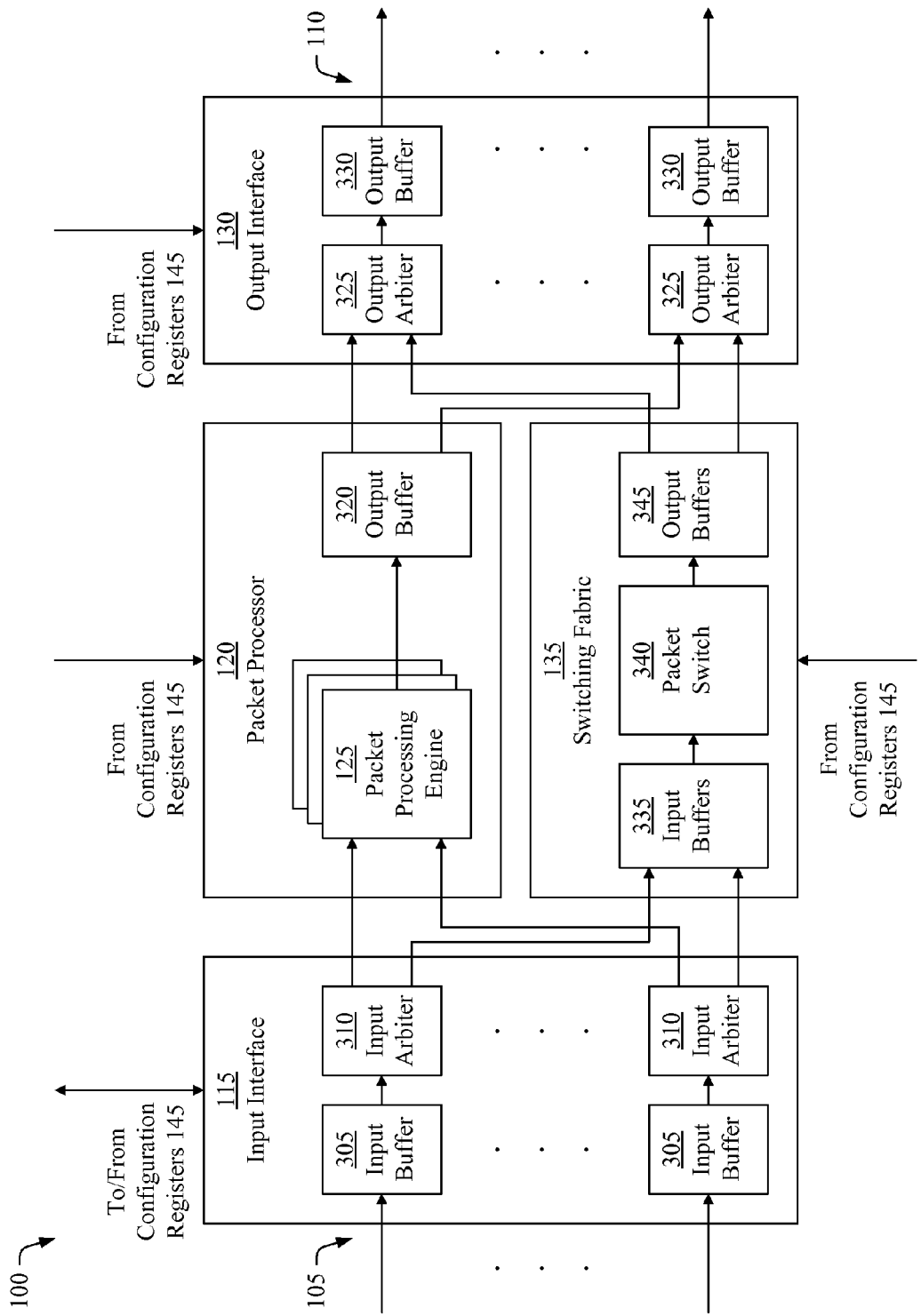
FIG. 3 is a block diagram of portions of a packet switch, in accordance with an embodiment of the present invention.

FIG. 3 illustrates portions of the packet switch 100, in accordance with an embodiment of the present invention. The input interface 115 includes input buffers 305 and input arbiters 310. Each of the input buffers 305 is coupled to and associated with one of the input ports 105 and one of the input arbiters 310. Additionally, each of the input arbiters 310 is coupled to the packet processor 120 and the switching fabric 135. The input buffer 305 receives data packets at the input port 105 associated with the input buffer 305 and passes the data packets to the arbiter 310 associated with the input buffer 305. In turn, the input arbiter 310 routes each of the data packets received from the input buffer 305 to either the packet processor 120 or the switching fabric 135 based on the content of the data packet. The input buffer 305 may include a First-In-First-Out (FIFO) queue for storing the data packets received at the input port 105. The input arbiter 310 may include a demultiplexer or a packet switch for routing the data packets to the packet processor 120 or the switching fabric 135.

The output interface 130 includes output arbiters 325 and output buffers 330. Each of the output buffers 330 is coupled to and associated with one of the output arbiters 325. Additionally, each of the output buffers 330 is coupled to and associated with one of the output ports 110. The output arbiter 325 receives data packets from the packet processor 120 and the switching fabric 135, and passes the data packets to the output buffer 330 associated with the output arbiter 325. Additionally, the output arbiter 325 may include one or more data buffers for storing the data packets received from the packet processor 120 and the switching fabric 135. Further, the output arbiter 325 may determine an order for passing the data packets stored in the output arbiter 325 to the output buffer 330, for example by using a round robin algorithm. The output arbiter 325 may include a multiplexer or a packet switch for passing data packets from the packet processor 120 and the switching fabric 135 to the output buffer 330. The output buffer 330 provides the data packets to the output port 110 associated with the output buffer 330 and may transmit the data packets to an external recipient of the packet switch 100. The output buffer 330 may include a FIFO queue for storing the data packets received from the output arbiter 325 associated with the output buffer 330.

The packet processor 120 includes the packet processing engines 125 and an output buffer 320. Each packet processing engine 125 is coupled to the input arbiters 310. The output buffer 320 is coupled to the packet processing engines 125 and to the output arbiters 325 of the output interface 130. The packet processing engines 125 receive data packets from the input arbiters 310 and generate data packets based on the data packets received from the input arbiters 310. The packet processing engines 125 write the generated data packets into the output buffer 320 based on packet processing scenarios. For example, a packet processing engine 125 can write a data packet into the output buffer 320 based on configuration data defining a packet processing scenario in the configuration registers 145 (FIG. 1). Further, the output buffer 320 provides the data packets received from the packet processing engines 125 to the output arbiters 325 based on the configuration data in the configuration registers 145.

In one embodiment, the output buffer 320 can store two data packets. In this way, a packet processing engine 125 can write a data packet into the output buffer 320 while the output buffer 320 routes another data packet, which is contained in the output buffer 320, to one of the output arbiters 325. In other embodiments, the output buffer 320 can store more or fewer data packets.

In one embodiment, the input interface 115 receives at an input port 305 one or more data packets associated with a packet processing scenario and one or more data packets not associated with any packet processing scenario. The input interface 115 routes any data packet associated with the packet processing scenario to the packet processor 120 in the order in which the data packets are received by the input interface 115. Similarly, the input interface 115 routes any received data packet not associated with a packet processing scenario to the switching fabric 135 in the order the data packets are received by the input interface 115. Moreover, the input interface 115 can route the data packets not associated with a packet processing scenario to the switching fabric 135 while the packet processing engine 120 performs the packet processing scenario on the data packets received from the input interface 115. In this way, the input interface 115 can route data packets to the switching fabric 135 between accumulation periods of the packet processing scenario.

The switching fabric 135 includes input buffers 335, a packet switch 340, and output buffers 345. The input buffers 335 are coupled to the input arbiters 310 of the input interface 115 and the packet switch 340. The output buffers 345 are coupled to the packet switch 340 and the output arbiters 325 of the output interface 130. Moreover, each output buffer 345 is associated with one of the output arbiters 325. The packet switch 340 routes data packets received by the input buffers 335 to the output buffers 345 based on the content of the data packets. For example, the packet switch 340 can route a data packet from an input buffer 335 to an output buffer 345 based on a destination identifier in the data packet. The output buffer 345 provides the data packet to the output arbiter 325 associated with the output buffer 345.

In one embodiment, the input arbiters 310 provide data packets received from the input buffers 305 of the input interface 115 to the input buffers 335 of the switching fabric 135 according to priorities of the data packets. For example, the data packets received by the input buffers 335 may be RapidIO™ packets that include a priority. Moreover, each input buffer 335 may be configured to receive data packets based on a priority of the data packets. For example, the configuration registers 145 (FIG. 1) can be configured such that an input buffer 335 receives data packets having a selected RapidIO™ priority level (e.g., priority level 0, 1, 2 or 3).

Figure 4:
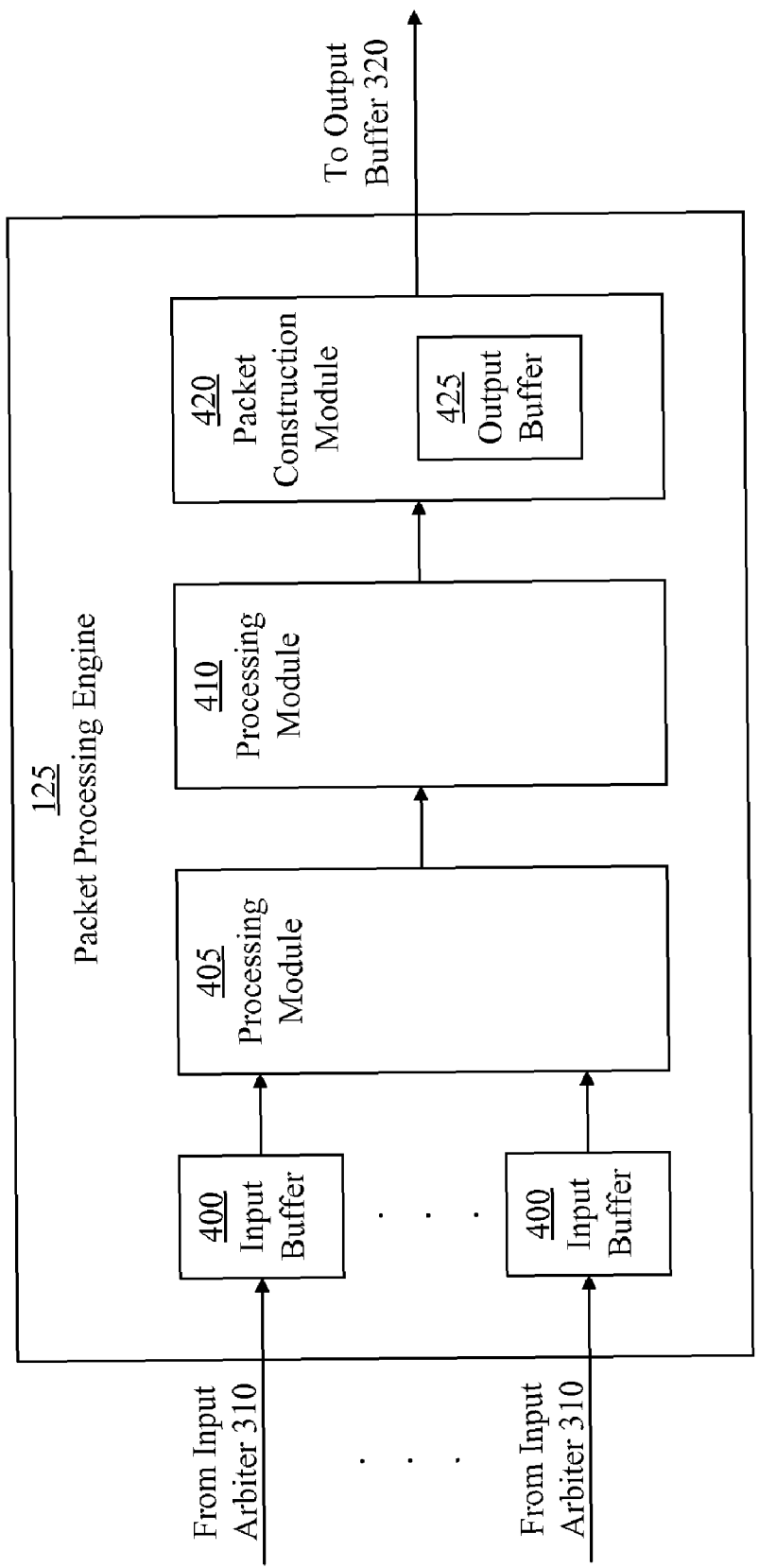
FIG. 4 is a block diagram of a packet processing engine, in accordance with an embodiment of the present invention.

FIG. 4 illustrates the packet processing engine 125, in accordance with an embodiment of the present invention. The packet processing engine 125 includes input buffers 400, a processing module 405, a processing module 410, and a packet construction module 420. Each of the input buffers 400 is coupled to one of the input arbiters 310 (FIG. 3) and to the processing module 405. Additionally, the processing module 405 is coupled to the processing module 410. The packet construction module 420 is coupled to the processing module 410 and the output buffer 320 (FIG. 3) of the packet processor 120.

The input buffers 400 receive data packets from the corresponding input arbiters 310 (FIG. 3). The processing module 405 reads the data packets in the input buffers 400 and performs one or more operations on the data packets according to a packet processing scenario. The operations of the packet processing scenario may include identifying data portions of the data payload in the data packet, increasing (padding) or decreasing the number of bits in one or more of the data portions, flipping the order of data bits in the data portions, and/or flipping the order of the data portions. The processing module 405 then provides the data portions to the processing module 410.

The processing module 410 can perform operations on the data portions received from the processing module 405 according to the packet processing scenario before providing the data portions to the packet construction module 420. The packet construction module 420 includes a data buffer 425 for storing the data portions received from the processing module 405. In one embodiment, the processing module 410 queues the data portions received from the processing module 405 and provides the data portions to the packet construction module 420 in the order the data portions are received from the processing module 405 (e.g., in a first-in-first-out order). The packet construction module 420 constructs a data packet based on the data portions received from the processing module 410. Additionally, the packet construction module 420 provides the constructed data packet to the output buffer 320 (FIG. 3). For example, the packet construction module 420 can provide the constructed data packet to the output buffer 320 based on a register in the packet processing engine 125 (FIG. 1) containing configuration data for a packet processing scenario. In other embodiments, the packet construction module 420 can construct multiple data packets based on the data portions received from the processing module 410. Although two processing modules 405 and 410 are illustrated in FIG. 4, the packet processing engine 125 may have more or fewer processing modules 405 or 410 arranged in other configurations.

A data packet received by the packet processing engine 125 may include a data payload including an imaginary data portion (I) and a quadrature data portion (Q). The processing modules 405 or 410 may extend/truncate these data portions, reorder these data portions, or reorder data bits in these data portions. For example, the data payload of the data packet may include an imaginary data portion (I) including four data bits ($I_0$ $I_1$ $I_2$ $I_3$) followed by a quadrature data portion (Q) including four data bits ($Q_0$ $Q_1$ $Q_2$ $Q_3$). Example operations of a packet processing scenario performed on exemplary data portions are described below. The processing module 405 or 410 may sign extend the least significant data bits in data portions as follows:

| Input data portions: | $I_0$ $I_1$ $I_2$ $I_3$ $Q_0$ $Q_1$ $Q_2$ $Q_3$ |
|---|---|
| Output data portions: | $I_0$ $I_1$ $I_2$ $I_3$ $I_3$ $I_3$ $Q_0$ $Q_1$ $Q_2$ $Q_3$ $Q_3$ $Q_3$ |

The processing module 405 or 410 may sign extend the most significant data bits in data portions as follows:

| Input data portions: | $I_0$ $I_1$ $I_2$ $I_3$ $Q_0$ $Q_1$ $Q_2$ $Q_3$ |
|---|---|
| Output data portions: | $I_0$ $I_0$ $I_0$ $I_1$ $I_2$ $I_3$ $Q_0$ $Q_0$ $Q_0$ $Q_1$ $Q_2$ $Q_3$ |

The processing module 405 or 410 may flip the data bits in data portions as follows:

| Input data portions: | $I_0$ $I_1$ $I_2$ $I_3$ $Q_0$ $Q_1$ $Q_2$ $Q_3$ |
|---|---|
| Output data portions: | $I_3$ $I_2$ $I_1$ $I_0$ $Q_3$ $Q_2$ $Q_1$ $Q_0$ |

The processing module 405 or 410 may reorder data portions as follows:

| Input data portions: | $I_0$ $I_1$ $I_2$ $I_3$ $Q_0$ $Q_1$ $Q_2$ $Q_3$ |
|---|---|
| Output data portions: | $Q_0$ $Q_1$ $Q_2$ $Q_3$ $I_0$ $I_1$ $I_2$ $I_3$ |

The processing module 405 or 410 may interleave data bits of data portions as follows:

| Input data portions: | $I_0$ $I_1$ $I_2$ $I_3$ $Q_0$ $Q_1$ $Q_2$ $Q_3$ |
|---|---|
| Output data portions: | $I_0$ $Q_0$ $I_1$ $Q_1$ $I_2$ $Q_2$ $I_3$ $Q_3$ |

The processing module 405 or 410 may perform post dynamic ranging on data bits of data portions as follows:

| Input data portions: | $I_0$ $I_1$ $I_2$ $I_3$ $I_4$ $I_5$ $I_6$ $I_7$ $Q_0$ $Q_1$ $Q_2$ $Q_3$ $Q_4$ $Q_5$ $Q_6$ $Q_7$ |
|---|---|
| Output data portions: | $I_4$ $I_5$ $I_6$ $I_7$ $Q_4$ $Q_5$ $Q_6$ $Q_7$ |

The processing modules 405 and 410 may sum data portions as follows:

| Input data portions: | $I_{00}$ $Q_{00}$ $I_{01}$ $Q_{01}$ $I_{02}$ $Q_{02}$ $I_{03}$ $Q_{03}$ |
|---|---|
| | $I_{10}$ $Q_{10}$ $I_{11}$ $Q_{11}$ $I_{12}$ $Q_{12}$ $I_{13}$ $Q_{13}$ |
| Output data portions: | $I_{R0}$ $Q_{R0}$ $I_{R1}$ $Q_{R1}$ $I_{R2}$ $Q_{R2}$ $I_{R3}$ $Q_{R3}$ |
| where $I_{Ri} = I_{0i} + I_{1i}$ and $Q_{Ri} = Q_{0i} + Q_{1i}$, for i = 0 to 3 | |

The processing modules 405 or 410 may perform a sequence of operations on the data portions (I and Q) according to the packet processing scenario. For example, assuming that input data portions have an IQ format, are IQ interleaved, and each of the I and Q data portions has 6 bits, the processing modules 405 or 410 may perform the following sequence of operations to produce an interleaved, IQ-flipped, sign-extended output.

| Input: | $I_0$ $Q_0$ $I_1$ $Q_1$ $I_2$ $Q_2$ $I_3$ $Q_3$ $I_4$ $Q_4$ $I_5$ $Q_5$ |
|---|---|
| Deinterleave I and Q: | $I_0$ $I_1$ $I_2$ $I_3$ $I_4$ $I_5$ $Q_0$ $Q_1$ $Q_2$ $Q_3$ $Q_4$ $Q_5$ |
| Sign extend LSB to 8 bits: | $I_0$ $I_1$ $I_2$ $I_3$ $I_4$ $I_5$ $I_5$ $I_5$ $Q_0$ $Q_1$ $Q_2$ $Q_3$ $Q_4$ $Q_5$ $Q_5$ $Q_5$ |
| Flip: | $I_5$ $I_5$ $I_5$ $I_4$ $I_3$ $I_2$ $I_1$ $I_0$ $Q_5$ $Q_5$ $Q_5$ $Q_4$ $Q_3$ $Q_2$ $Q_1$ $Q_0$ |
| Change IQ order: | $Q_5$ $Q_5$ $Q_5$ $Q_4$ $Q_3$ $Q_2$ $Q_1$ $Q_0$ $I_5$ $I_5$ $I_5$ $I_4$ $I_3$ $I_2$ $I_1$ $I_0$ |
| IQ Output Interleave: | $Q_5$ $I_5$ $Q_5$ $I_5$ $Q_5$ $I_5$ $Q_4$ $I_4$ $Q_3$ $I_3$ $Q_2$ $I_2$ $Q_1$ $I_1$ $Q_0$ $I_0$ |

In other embodiments, the packet processing engine 125 can perform other operations according to the packet processing scenario. For example, the packet processing scenario may include summing or other arithmetic operations on data payloads from multiple data packets.

Figure 5:
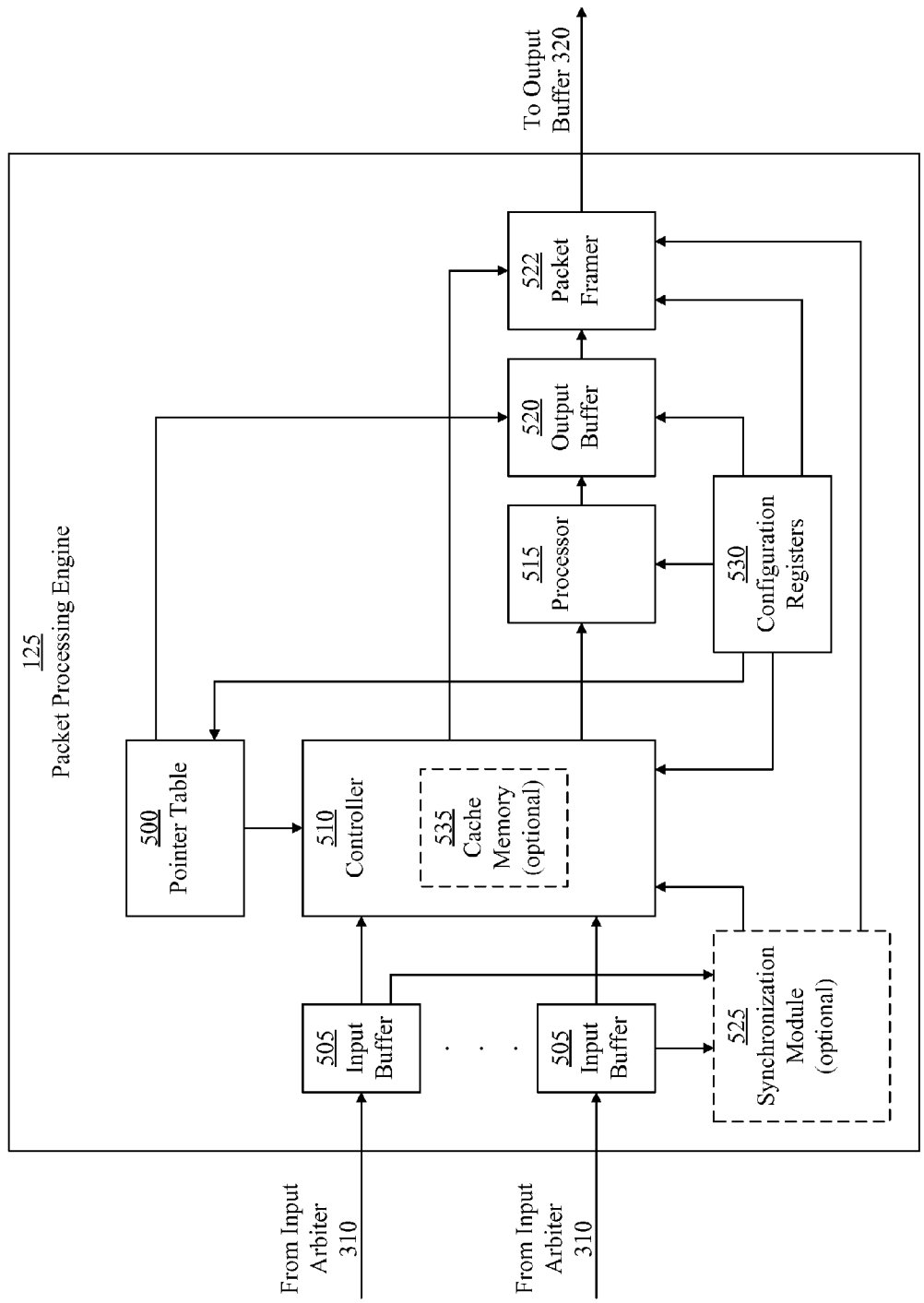
FIG. 5 is a block diagram of a packet processing engine, in accordance with an embodiment of the present invention.

FIG. 5 illustrates the packet processing engine 125, in accordance with another embodiment of the present invention. The packet processing engine 125 includes a pointer table 500, input buffers 505, a controller 510, a processor 515, an output buffer 520, a packet framer 522, and configuration registers 530. The input buffers 505 are data buffers coupled to corresponding input arbiters 310 (FIG. 3) and to the controller 510. The pointer table 500 is coupled to the controller 510 and the output buffer 520. The processor 515 is coupled to the controller 510 and the output buffer 520. The packet framer 522 is coupled to the output buffer 520 and to the output buffer 320 (FIG. 3) of the packet processor 120. The configuration registers 530 are coupled to the pointer table 500, the controller 510, the processor 515, the output buffer 520, and the packet framer 522.

The input buffer 505 receives data packets from the input arbiters 310 (FIG. 3). The pointer table 500 associates input data locations in the input buffer 505 to output data locations in the output buffer 520 according to a packet processing scenario defined by configuration data stored in the configuration registers 530. The pointer table 500 may be, for example, a data memory or a data structure for storing pointers, each of which maps an input location in the input buffer 505 to an output location in the output buffer 520. The input locations in the input buffer 505 can each store one or more data portions of a data packet. The output locations in the output buffer 520 can each store one or more data portions of an output data packet (i.e., a data packet generated by the packet processing engine 125). In this way, the pointer table 500 can map data portions in the input buffer 505 to data portions in the output buffer 520, for example to reorder the data portions. In one embodiment, each input buffer 505 can store two data packets. In this way, the input buffer 505 can receive a data packet from an input arbiter 310 while the controller 510 reads another data packet stored in the input buffer 505. In other embodiments, the input buffer 505 can store more or fewer data packets.

The controller 510 reads data portions in the input buffers 505 based on the pointer table 500 and provides the data portions to the processor 515. In turn, the processor 515 performs one or more operations on the data portions according to the packet processing scenario and provides the data portions to the output buffer 520. Additionally, the controller 510 identifies header information in the data packets and provides the header information to the packet framer 522. In turn, the packet framer 522 uses the header information to generate a header for the generated data packet. For example, the packet framer 522 may use a destination address in the header to determine a destination address for a generated data packet. The packet framer 522 receives the data portions from the output buffer 520 and the header information from the controller 510, generates a data packet based on the pointer table 500, the data portions, and the header information, and provides generated data packet to the output buffer 320 (FIG. 3). In one embodiment, the processor 515 includes the controller 510.

In some embodiments, the packet framer 522 generates multiple data packets based on the data portions received from the output buffer 520. The data packets include the same destination identifier but each of the data packets may include a unique destination address. The packet framer 522 can generate the destination addresses for the data packets, for example, based on a destination address received from the controller 510 (FIG. 5) or based on a start address and address offset stored in the configuration registers 145 (FIG. 1). In one embodiment, the packet framer 522 can generate the destination addresses based on a stop address stored in the configuration registers 145. In this embodiment, a first destination address is the start address and a subsequent destination address is determined by adding the address offset to the previous destination address until the stop address is reached. The next destination address then wraps around to the start address.

In one embodiment, the packet processing engine 125 uses dynamic packet accumulation to accumulate data packets in the input buffers 505 before processing the data packets according to a packet processing scenario. The packet processing engine 125 accumulates the data packets in the input buffers 505 within an accumulation period before processing the data packets according to the packet processing scenario.

The packet processing engine 125 may start the accumulation period at the arrival time of a first data packet to be processed according to the packet processing scenario. If a data packet required for a packet processing scenario arrives after the accumulation period, the packet processing engine 125 replaces the data packet with a default data packet having a default data payload. For example, the default data payload may include data bits each having a value of zero. As another example, the default data payload may include data bits each having a value of one. The packet processing engine 125 processes the data packets received within the accumulation period, including any replacement data packets, to generate one or more data packets. Further, the packet processing engine 125 provides each generated data packet to the output buffer 320 (FIG. 3) of the packet processor 120.

The dynamic packet accumulation process described above can provide significant flexibility in system synchronization of the packet switch 100. According to some embodiments of the present invention, the packet processing engine 125 starts an accumulation period for a packet processing scenario when a first data packet associated with the packet processing scenario is received by the packet processing engine 125. This allows for initialization of the packet processing engine 125 before bringing up transmitters connected to the packet switch 100 because each packet processing scenario is performed after the packet processing engine 125 begins receiving data packets.

In one embodiment, the packet processing engine 125 can generate an initialization signal to start the accumulation period of a packet processing scenario. In another embodiment, the packet processor 120 can generate an initialization signal for multiple packet processing scenarios, such as a group packet processing scenario, to start the accumulation period for the multiple packet processing scenarios at substantially the same time.

In one embodiment, the packet processor 120 performs packet processing scenarios in a time-division multiplexed (TDM) mode of operation. In this embodiment, an accumulation period is selected such that each packet processing scenario can be processed within the accumulation period. For example, the accumulation period can be the longest processing time among packet processing scenarios performed by the packet processor 120. Further, the packet processor 120 may be configured to transmit the data packets generated by the packet processing engines 125 in the accumulation period to the output interface 130 in parallel. For example, the packet switch 100 may initiate transmission of the data packets generated in an accumulation period at the start of a subsequent accumulation period.

In a further embodiment, the packet processing engine 125 includes an optional synchronization module 525 coupled to the input buffer 505, the controller 510, and the packet framer 522. The synchronization module 525 monitors the timing of the data packets received at the input buffer 505 and provides timing information to the controller 510. The controller 510 uses the timing information, for example, to determine an accumulation period for a packet processing scenario. Additionally, the synchronization module 525 can provide timing information to the packet framer 522 for the time-division multiplexed mode of operation.

In one embodiment, the configuration registers 145 (FIG. 1) of the packet switch 100 (FIG. 1) include the configuration registers 530 of the packet processing engine 125. In this embodiment, the configuration registers 530 are user-configurable through the communication interface 150 or the input interface 115. In this way, a user can configure the packet processing scenario performed by the packet processing engine 125.

In one embodiment, the packet processing engine 125 includes a cache memory 535 coupled to the controller 510. For example, the controller 510 can include the cache memory 535. The controller 510 writes data portions into the cache memory 535 and can subsequently access the data portions in the cache memory 535 instead of accessing the data portions in the input buffer 505. The cache memory 535 can be a random access memory, a data buffer, a register, or the like. In one embodiment, the controller 510 writes the data portion most recently accessed in the input buffer 505 into the cache memory 535. For example, the cache memory 535 can be a register that stores the data portion most recently accessed in the input buffer 505. Accessing a data portion in the cache memory 535 may consume less power than accessing the data portion in the input buffer 505, which may reduce the power requirements of the packet switch 100 (FIG. 1).

Figure 6:
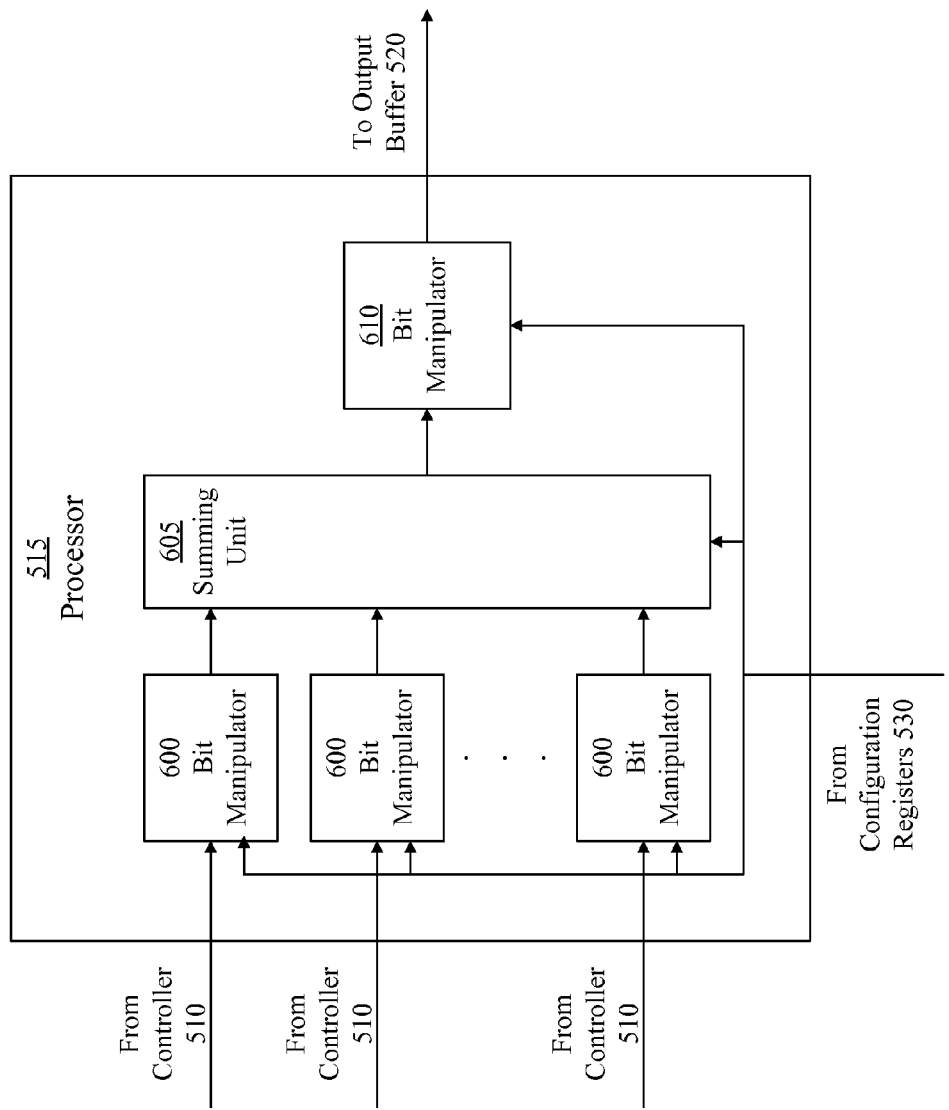
FIG. 6 is a block diagram of a processor, in accordance with an embodiment of the present invention.

FIG. 6 illustrates the processor 515, in accordance with an embodiment of the present invention. The processor 515 includes bit manipulators 600, a summing unit 605, and a bit manipulator 610. The bit manipulators 600 are each coupled to the controller 510 (FIG. 5) and to the summing unit 605. The bit manipulator 610 is coupled to the summing unit 605 and the output buffer 520 (FIG. 5). Additionally, the bit manipulators 600, the summing unit 605, and the bit manipulator 610 are each coupled to the configuration registers 530 (FIG. 5). The configuration registers 530 store configuration data for configuring the bit manipulators 600, the summing unit 605, and the bit manipulator 610 to perform a packet processing scenario.

The bit manipulators 600 each perform operations on data portions received from the controller 510 (FIG. 5) according to the packet processing scenario defined by configuration data stored in the configuration registers 530 (FIG. 5). For example, the bit manipulators 600 can perform deinterleaving, sign extension, truncation, and/or dynamic ranging operations on the data portions. The summing unit 605 performs summation operations on data portions received from the bit manipulators 600 according to the packet processing scenario. Additionally, the summing unit 605 can perform dynamic/saturation ranging on the data portions.

The bit manipulator 610 performs flipping (e.g., MSB/LSB), IQ ordering, and/or IQ interleaving operations on the data portions received from the summing unit 605 according to the packet processing scenario. Additionally, the bit manipulator 610 can perform masking operations on the data portions. The bit manipulator 610 provides the processed data portions to the output buffer 520 (FIG. 5).

Figure 7:
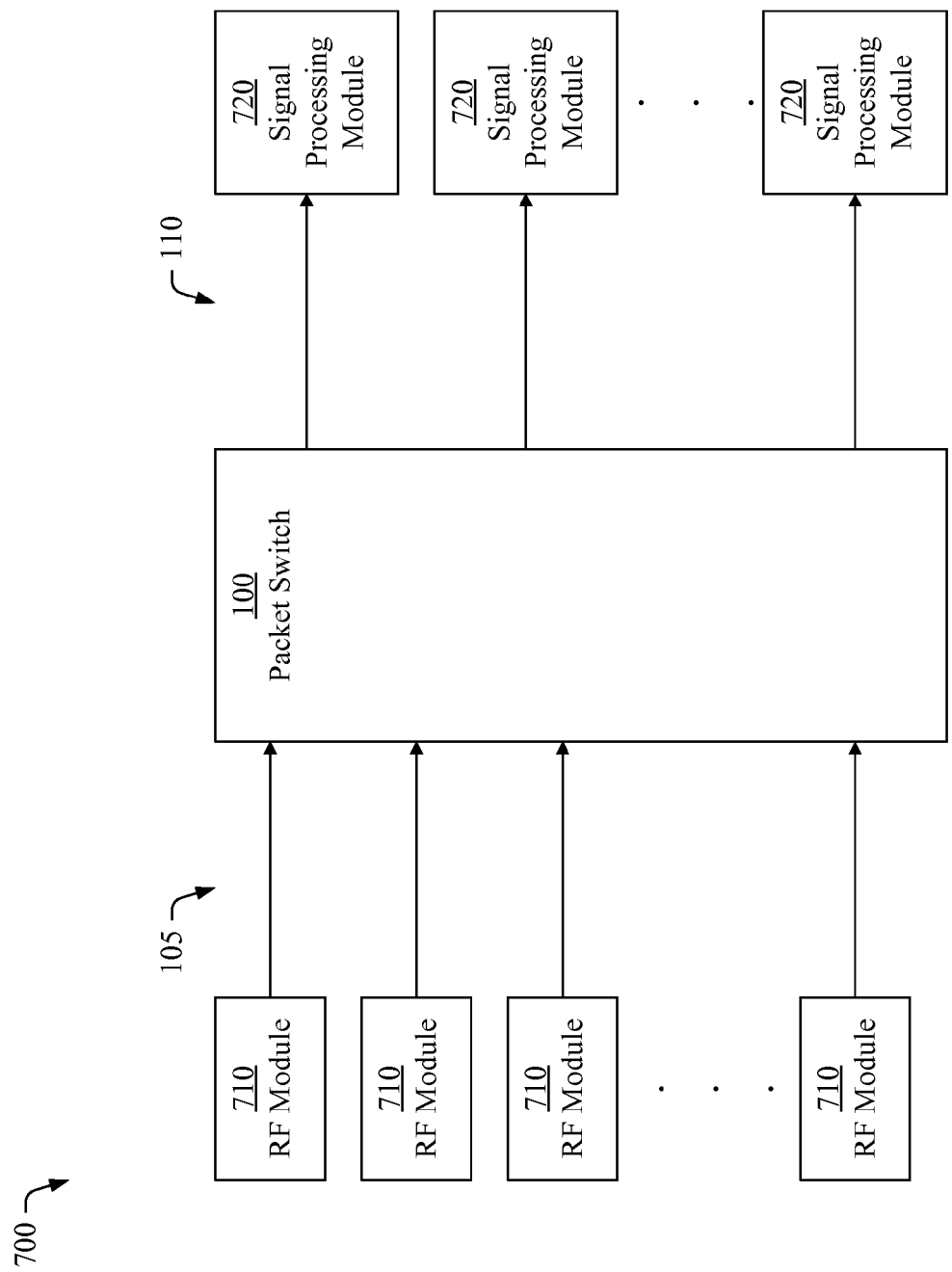
FIG. 7 is a block diagram of a base station containing a packet switch, in accordance with an embodiment of the present invention.

FIG. 7 illustrates the packet switch 100, in accordance with another embodiment of the present invention. As illustrated, the packet switch 100 is contained in an exemplary wireless base station 700. The wireless base station 700 includes radio-frequency (RF) modules 710 coupled in communication with respective input ports 105 of the packet switch 100. For example, the RF module 710 can be an RF card including an RF receiver. The packet switch 100 receives data packets from the RF modules 710 at the input ports 105. The data packets contain data payloads for communications received by the RF modules 710. For example, the data payloads may include digital representations of radio signals received by the RF modules 710.

The wireless base station 700 further includes signal processing modules 720 coupled to respective output ports 110 of the packet switch 100. For example, the signal processing modules 720 can be digital signal processors (DSPs) or chip rate processors (CRPs). The signal processing modules 720 receive data packets from the packet switch 100 and perform operations, such as baseband processing functions, on the data payloads contained in the data packets. For example, the signal processing modules 720 can demodulate and decode the data portions of the data payloads to reproduce a radio signal.

The packet switch 100 receives data packets from the RF modules 710 and can perform packet processing scenarios on the data packets to facilitate operations performed on the data packets by the signal processing modules 720. In this way, the packet switch 100 may reduce the processing load of the signal processing modules 720 and improve the performance of the base station 700.

Figure 8:
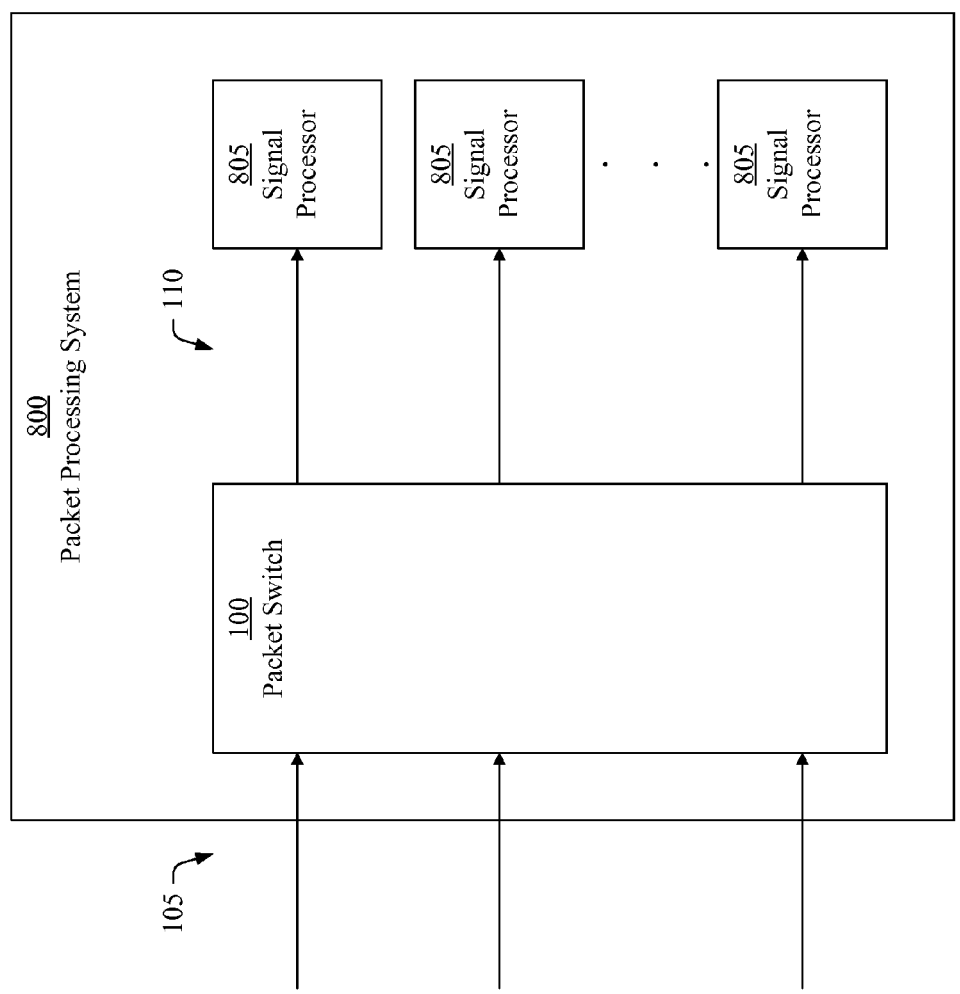
FIG. 8 is a block diagram of a packet processing system, in accordance with an embodiment of the present invention.

FIG. 8 illustrates a packet processing system 800, in accordance with an embodiment of the present invention. The packet processing system 800 includes the packet switch 100 and one or more signal processors 805. The signal processor 805 may be any system or device that processes data packets. For example, the signal processor 805 may include a digital signal processor for performing operations on data payloads of the data packets. Each of the signal processors 805 is coupled to a respective output port 110 of the packet switch 100. The packet switch 100 receives data packets at the input ports 105 and preprocesses the data packets according to one or more packet processing scenarios, as is described more fully herein. The packet switch 100 routes the preprocessed data packets to the signal processors 805, and the signal processors 805 further process the data packets. Thus, the packet switch 100 and the signal processors 805 cooperate with each other to process the data packets. Moreover, preprocessing the data packets in the packet switch 100 reduces the processing load of the signal processors 805, which may increase the performance and/or throughput of the packet processing system 800.

Figure 9A:
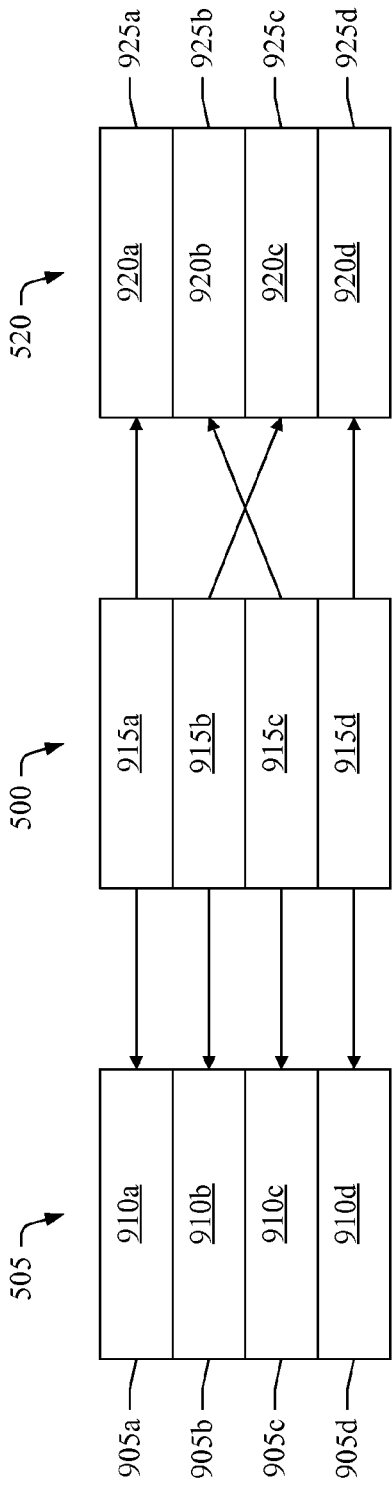
FIG. 9A is a schematic diagram of an exemplary mapping of a pointer table, in accordance with an embodiment of the present invention.

FIG. 9A illustrates an exemplary mapping of the pointer table 500, in accordance with an embodiment of the present invention. As illustrated, the pointer table 500 maps locations 905 of the input buffer 505 to locations 925 of the output buffer 520. The pointer table 500 can map the locations 905 to the locations 925 based on configuration data stored in the configuration registers 145 (FIG. 1). In this way, the pointer table 500 can be configured for a packet processing scenario.

Each location 905 of the input buffer 505 can store a data portion 910, and each location 925 of the output buffer 520 can store a data portion 920. The pointer table 500 includes pointers 915, each of which maps one of the locations 905 of the input buffer 505 to one of the locations 925 of the output buffer 520. As illustrated in FIG. 9A, the pointer table 500 includes four pointers 915*a-b*. The pointer 915*a* maps the location 905*a* to the location 925*a*. The pointer 915*b* maps the location 905*b* to the location 925*c*. The pointer 915*c* maps the location 905*c* to the location 925*b*. The pointer 915*d* maps the location 905*d* to the location 925*d*. As may be envisioned from FIG. 9A, the pointer table 500 maps the locations 905*a-d* to the locations 925*a-d* for an interleave operation of a packet processing scenario. In other embodiments, the input buffer 505 can have more or fewer locations 905, the pointer table 500 can have more or fewer pointers 915, and the output buffer 520 can have more or fewer locations 925.

In one embodiment, the processor 515 (FIG. 5) generates each data portion 920 and writes the data portion 920 into the output buffer 520. In turn, the output buffer 520 provides the data portions 920 in the output buffer to the packet framer 522 for generating an output data packet. The output data packet includes a sequence of the data portions 920 having a sequential order, which are stored in a corresponding sequence of the locations 925. The packet framer 522 provides the output data packet to the output buffer 320 (FIG. 3) by successively outputting each data portion 920 stored in the output buffer 520 to the output buffer 320 (FIG. 3) according to the sequential order.

In one embodiment, the pointers 915 in the pointer table 500 have a sequential order, and the processor 515 (FIG. 5) writes the data portions 920 of the output data packet into the output buffer 520 successively according to the sequential order of the pointers 915 in the pointer table 500. Further, a user can write configuration data into the configuration registers 145 (FIG. 1) to configure the pointer table 500 such that the data portions 910 in the input buffer 505 have a sequential order corresponding to the sequence of pointers 915 in the pointer table 500. Thus, the processor 515 writes the data portions 920 of the output data packet into the output buffer 520 in the sequential order of the data portions 910 in the input buffer 505. In this embodiment, the output buffer 520 accumulates the data portions 920 in the output buffer 520 before successively outputting each data portion 920 to the packet framer 522. Configuring the pointer table 500 based on the sequence of the data portions 910 in the input buffer 505 may reduce power consumption when a data portion 910 is stored into, and subsequently accessed from, the cache memory 535 (FIG. 5), as is described more fully herein with reference to FIG. 11.

Figure 9B:
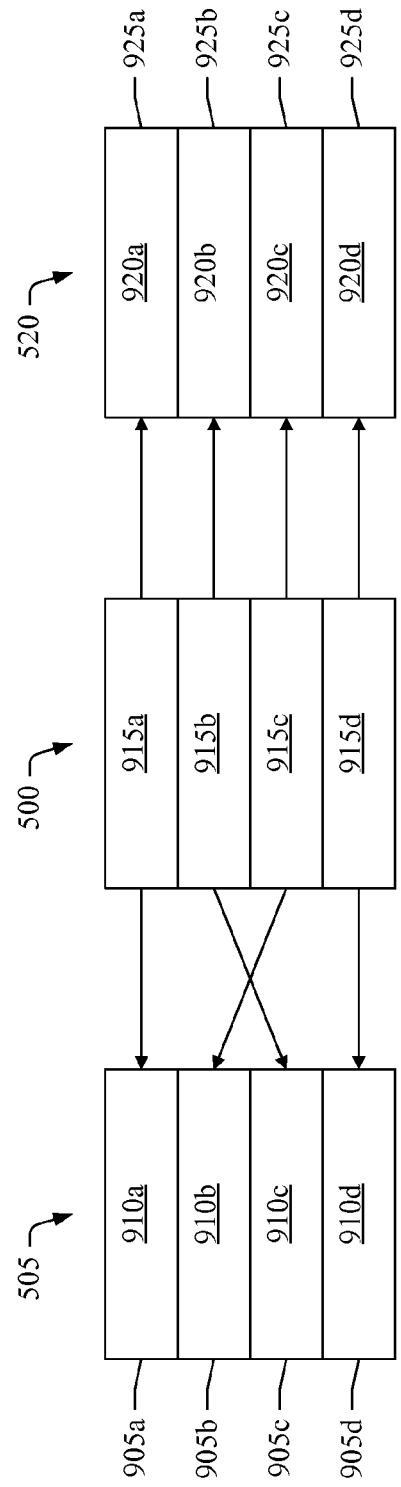
FIG. 9B is a schematic diagram of an exemplary mapping of a pointer table, in accordance with an embodiment of the present invention.

FIG. 9B is a block diagram of an exemplary mapping of the pointer table 500, in accordance with an embodiment of the present invention. As illustrated in FIG. 9B, the pointer table 500 includes four pointers 915*a-d*. The pointer 915*a* maps the location 905*a* to the location 925*a*. The pointer 915*b* maps the location 905*c* to the location 925*b*. The pointer 915*c* maps the location 905*b* to the location 925*c*. The pointer 915*d* maps the location 905*d* to the location 925*d*. As may be envisioned from FIG. 9B, the pointer table 500 maps the locations 905*a-d* to the locations 925*a-d* for an interleave operation of a packet processing scenario. In other embodiments, the input buffer 505 can have more or fewer locations 905, the pointer table 500 can have more or fewer pointers 915, and the output buffer 520 can have more or fewer locations 925.

The output data packet includes a sequence of the data portions 920 having a sequential order, which are stored in a corresponding sequence of the locations 925. Moreover, the pointer table 500 includes a sequence of the pointers 915. A user can write configuration data into the configuration registers 145 (FIG. 1) to configure the pointer table 500 such that the sequence of the pointers 915 corresponds to the sequence of the locations 925 in the output buffer 520. The processor 515 (FIG. 5) generates each data portion 920 of the output data packet successively in the sequential order of the data portions 920 by accessing each pointer 915 in the pointer table 500 successively in the sequential order of the pointers 915. Moreover, the processor 515 writes each data portion 920 of the output data packet into the output buffer 520 successively in the sequential order of the data portions 920 based on a packet processing scenario. In this configuration, the output buffer 520 can begin outputting the data portions 920 of the output data packet to the packet framer 522 in the sequential order before all of the data portions 920 of the output data packet are stored in the output buffer 520. Further, the packet framer 522 can output the data portions 920 of the output data packet to the output buffer 320 (FIG. 3) in the sequential order before all of the data portions 920 of the output data packet are stored in the output buffer 520. In this way, the latency of the packet switch 100 (FIG. 1) is reduced. Thus, a user can configure the pointer table 500 to reduce the power consumption of the packet switch as illustrated in FIG. 9A or to reduce the latency of the packet switch 100 (FIG. 1) as illustrated in FIG. 9B.

In one embodiment, the output buffer 520 outputs a data portion 920 of the output data packet during each clock cycle of successive clock cycles. Moreover, the output buffer 520 can begin to output the first data portion of the output data packet before receiving all the data portions 920 of the output data packet. In this embodiment, the packet framer 522 determines when the processor 515 (FIG. 5) will write the data portions 920 of the output data packet into the output buffer 520, for example based on configuration data in the configuration registers 145 (FIG. 1). In another embodiment, the packet framer 522 includes circuitry for determining whether the sequence of the pointers 915 correspond to the sequence of the data portions 920 in the output data packet. The packet framer 522 determines when to send the first data portion 920 of the output data packet to the output buffer 320 (FIG. 3) such that the packet framer 522 can send a data portion 920 of the output data packet to the output buffer 320 during each clock cycle of the successive clock cycles. In this way, the packet framer 522 uses the output buffer 520 to match the input data rate of the processor 515 to the output data rate of the packet processing engine 125.

Figure 10A:
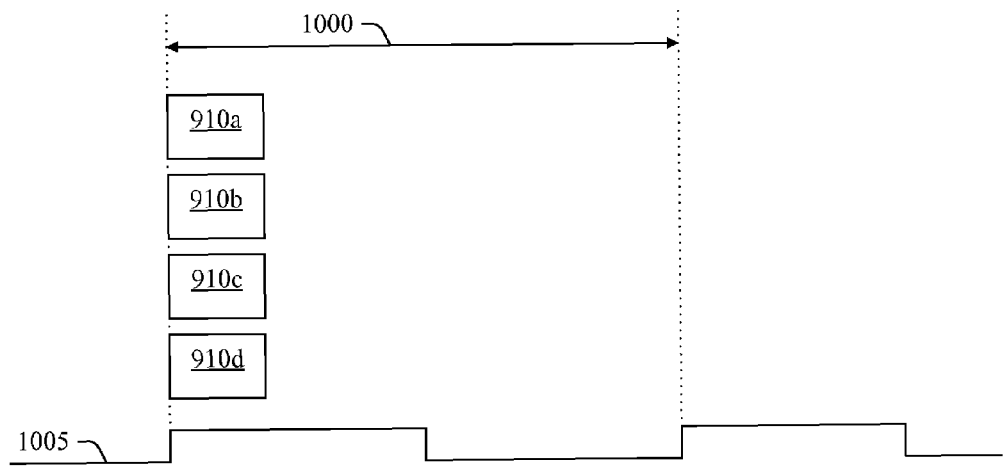
FIG. 10A is a timing diagram for reading data portions in an input buffer, in accordance with an embodiment of the present invention.

FIG. 10A is a timing diagram for accessing data portions 910 from the input buffer 505 (FIG. 9), in accordance with an embodiment of the present invention. As illustrated in FIG. 10A, a clock signal 1005 includes a clock cycle 1000. For example, the clock cycle 1000 may extend from a first rising edge to a second rising edge of the clock signal 1005. In this embodiment, the controller 510 (FIG. 5) reads multiple data portions 910 in the input buffer 505 at substantially the same time in the clock cycle 1000. For example, the controller 510 can read each of the data portions 910*a-d* in the input buffer 505 at a start of the clock cycle 1000. In other embodiments, the controller 510 can read more or fewer data portions 910 in the input buffer 505 in the clock cycle 1000 or the controller 510 can read data portions 910 from multiple input buffers 505 in the clock cycle 1000.

Figure 10B:
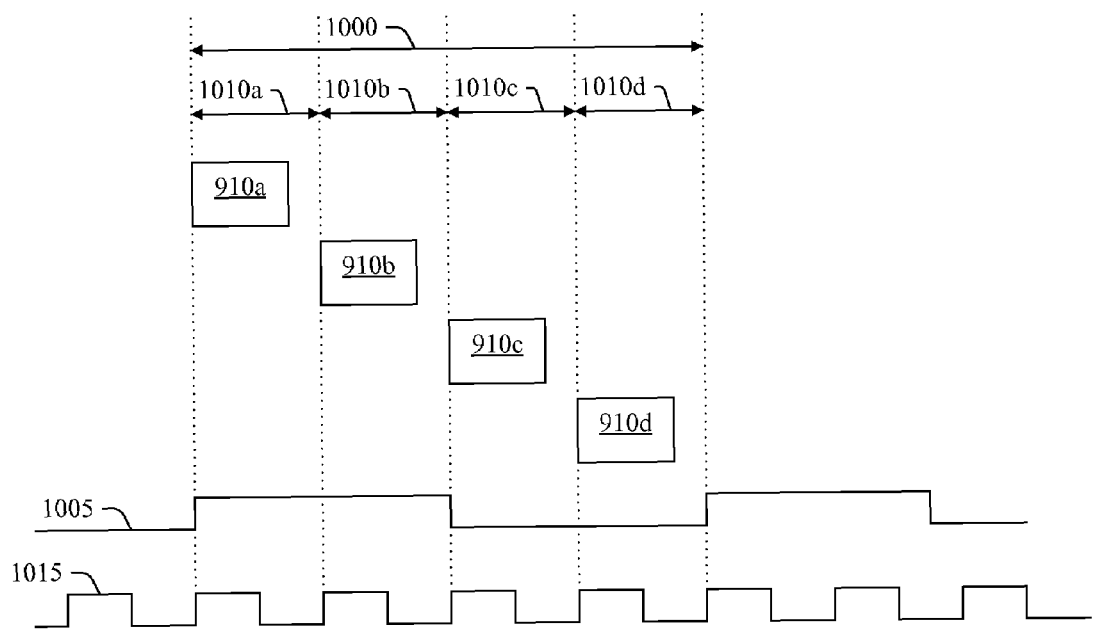
FIG. 10B is a timing diagram for reading data portions in an input buffer, in accordance with an embodiment of the present invention.

FIG. 10B is a timing diagram for accessing data portions 910 in the input buffer 505 (FIG. 9), in accordance with another embodiment of the present invention. As illustrated in FIG. 10B, the clock cycle 1000 includes subcycles 1010 distributed in the clock cycle 1000. For example, the subcycle 1010 may extend from a first rising edge to a second rising edge of the clock signal 1015. In this embodiment, the controller 510 (FIG. 5) reads multiple data portions 910 in the input buffer 505 in multiple subcycles 1010 of the clock cycle 1000. For example, the controller 510 can read the data portions 910*a-d* in the input buffer 505 in the clock cycle 1000 by reading one of the data portions 910*a-d* in each subcycle 1010 in the clock cycle 1000. In this way, reading the data portions 910*a-d* in the input buffer 505 is distributed in the clock cycle 1000, which may reduce power spikes in the packet switch 100 (FIG. 1). In other embodiments, the controller 510 can read more or fewer data portions 910 in the input buffer 505 in each subcycle 1010 and each clock cycle 1000 may have more or fewer subcycles 1010. In some embodiments, the controller 510 can read data portions 910 in multiple input buffers 505 during the multiple subcycles 1010 of the clock cycle 1000.

Figure 11:
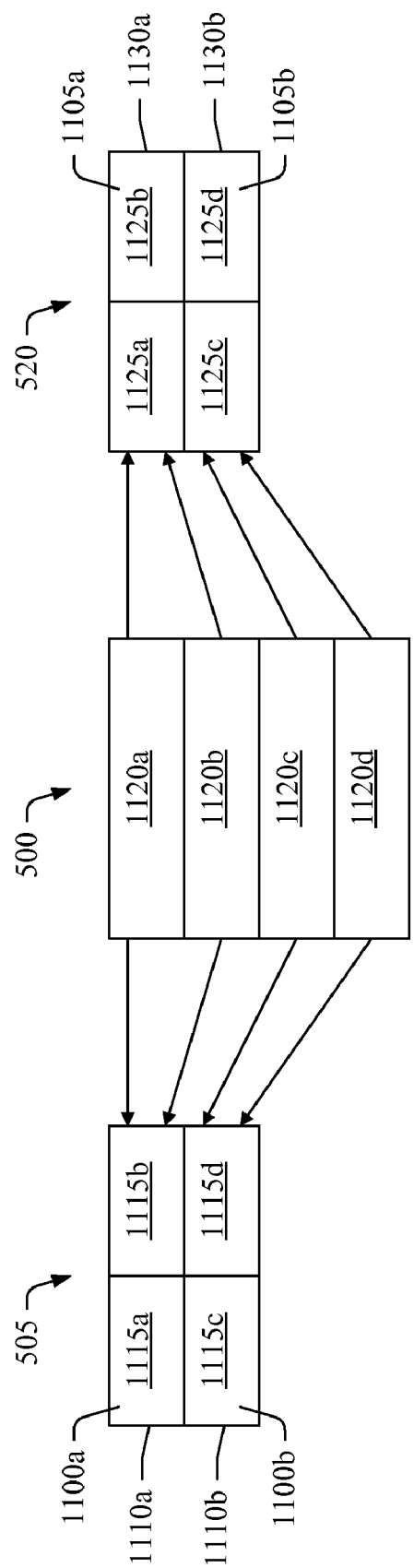
FIG. 11 is a schematic diagram of an exemplary mapping of a pointer table, in accordance with an embodiment of the present invention.

FIG. 11 an exemplary mapping of the pointer table 500, in accordance with an embodiment of the present invention. The pointer table 500 maps locations 1110 of the input buffer 505 to locations 1130 of the output buffer 520. Each location 1110 of the input buffer 505 stores a data portion 1100, and each location 1130 of the output buffer 520 stores a data portion

1105. Further, each data portion 1100 may include multiple data portions 1115 and each data portion 1105 may include multiple data portions 1125.

As illustrated in FIG. 11, the input buffer 505 includes data portions 1100*a-b* and the output buffer 520 includes data portions 1105*a-b*. The data portion 100*a* includes the data portion 1115*a* and the data portion 1115*b*. The data portion 100*b* includes the data portion 1115*c* and the data portion 1115*d*. The data portion 1105*a* includes the data portion 1125*a* and the data portion 1125*b*. The data portion 1105*b* includes the data portion 1125*c* and the data portion 1125*d*. In some embodiments, the input buffer 505 may include more or fewer data portions 1100, and the output buffer 520 may include more or fewer data portions 1105. In some embodiments, the data portions 1100 may each include more or fewer data portions 1115, and the data portions 1105 may each include more or fewer data portions 1125.

The pointer table 500 includes pointers 1120, each of which maps one of the locations 1110 of the input buffer 505 to one of the locations 1130 of the output buffer 520. As illustrated in FIG. 11, the pointer table 500 includes four pointers 1120*a-d*. The pointer 1120*a* maps the location 1110*a* to the location 1130*a*. The pointer 1120*b* maps the location 1110*a* to the location 1130*a*. The pointer 1120*c* maps the location 1110*b* to the location 1130*b*. The pointer 1120*d* maps the location 1110*b* to the location 1130*b*. Thus, multiple pointers 1120 of the pointer table 500 can map a location 1110 in the input buffer 505 to multiple locations 1130 in the output buffer 520. In this way, the packet processor 515 (FIG. 5) can access one data portion 1115 of the data portion 1110 based on a pointer 1120 to generate one data portion 1130 and can access another data portion 1115 of the data portion 1110 based on another pointer 1120 to generate another data portion 1130. In other embodiments, the input buffer 505 can have more or fewer locations 1110, the pointer table 500 can have more or fewer pointers 1120, and the output buffer 520 can have more or fewer locations 1130.

In one embodiment, the processor 515 (FIG. 5) accesses a data portion 1100 (e.g., data portion 1100*a*) including a first data portion 1115 (e.g., data portion 1115*a*) and a second data portion 1115 (e.g., data portion 1115*b*) in the input buffer 505 and generates a data portion 1125 (e.g., data portion 1125*a*) based on the first data portion 1115. The processor 515 then accesses the data portion 1100 in the input buffer 505 a second time and generates another data portion 1125 (e.g., data portion 1125*b*) based on the second data portion 1115. In an alternative embodiment, the processor 1115 writes the second data portion 1115 into the cache memory 535 (FIG. 5) and accesses the second data portion 1115 in the cache memory 535 instead of accessing the data portion 1100 in the input buffer 505 a second time. For example, the processor 515 can access the data portion 1100*a* in the input buffer 505, write the data portion 1100*a* into the cache memory 535, process the first data portion 1115*a*, and subsequently access the second data portion 1115*b* in the cache memory 535. In one embodiment, the cache memory 535 is a register, and the controller 510 writes the data portion 1100 most recently accessed in the input buffer 505 into the register. Accessing the second data portion 1115*b* in the cache memory 535 instead of accessing the data portion 1100*a* in the input data buffer 1110 a second time may reduce the power requirements of the packet switch 100 (FIG. 1).

Figure 12:
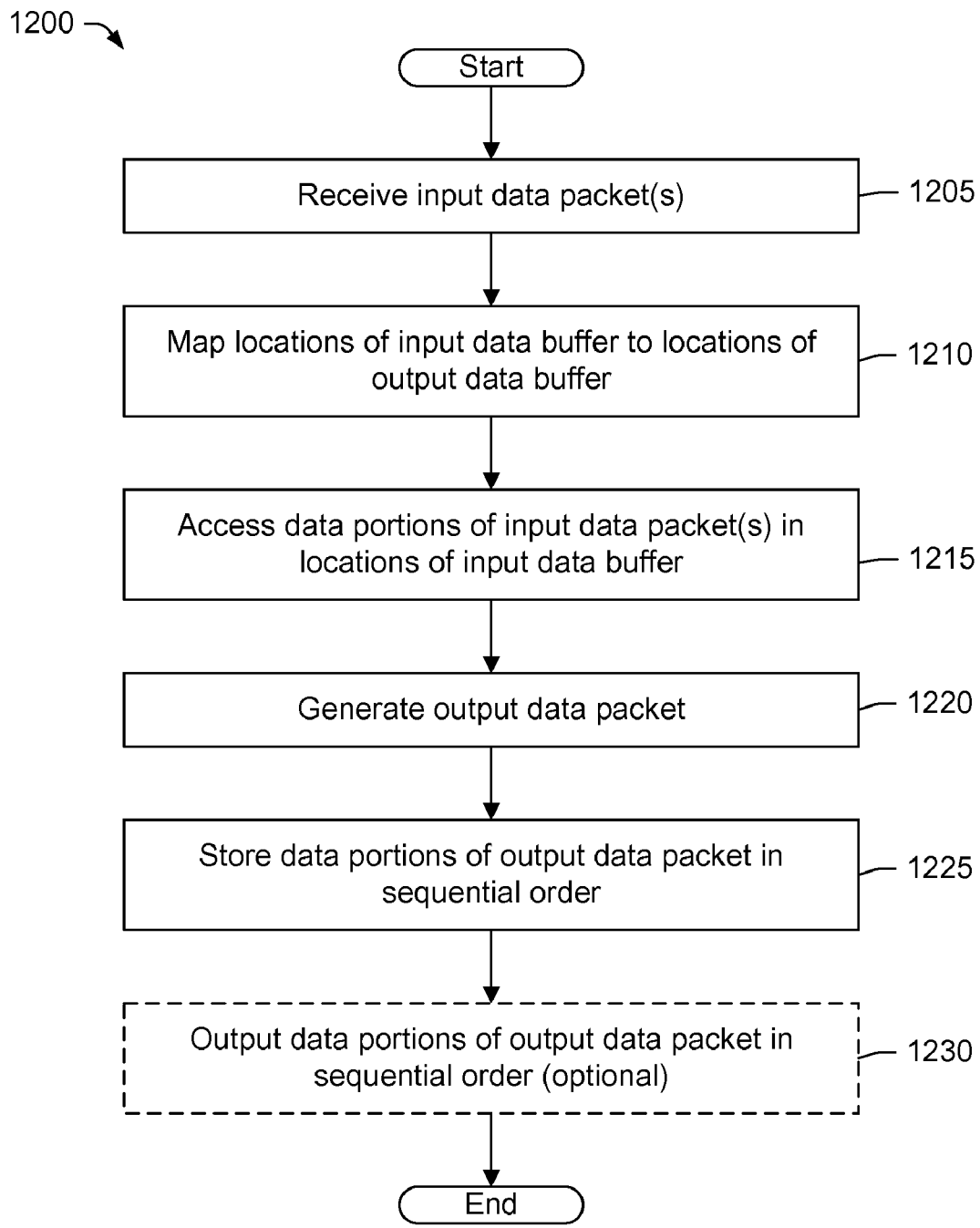
FIG. 12 is a flow chart for a method of processing a data packet, in accordance with an embodiment of the present invention.

FIG. 12 illustrates a method 1200 of processing a data packet, in accordance with an embodiment of the present invention. In step 1205, the input buffer 505 (FIG. 9) of the packet switch 100 (FIG. 1) receives input data packet(s). The method 1200 then proceeds to step 1210.

In step 1210, locations 905 (FIG. 9) of the input buffer 505 (FIG. 9) are mapped to locations 925 (FIG. 9) of the output buffer 520 (FIG. 9). In one embodiment, the pointer table 500 (FIG. 9) maps the locations 905 to the locations 925 based on configuration data in the configuration registers 145 (FIG. 1). The method 1200 then proceeds to step 1215.

In step 1215, the controller 510 (FIG. 5) accesses the data portions 910 (FIG. 9) of the input data packet(s) in the input buffer 505 (FIG. 9). The controller 510 can access the data portions 910 in subcycles 1010 (FIG. 10B) of a clock cycle 1000 (FIG. 10B). In one embodiment, the processor 515 (FIG. 5) includes the controller 510. In this embodiment, the processor 515 accesses the data portions 910 of the input data packet(s) in the input buffer 505. The method 1200 then proceeds to step 1220.

In step 1220, the processor 515 (FIG. 5) generates an output data packet based on the data portions 910 (FIG. 9). In one embodiment, the processor 515 accesses the data portions 910 in the input buffer 505 (FIG. 9) based on the pointer table 500. In a further embodiment, the processor 515 writes the data portion most recently accessed in the input buffer 505 into the cache memory 535 and subsequently accesses the data portion in the cache memory 535 during generation of the output data packet. In one embodiment, the output data packet includes a sequence of data portions 920 having a sequential order. The processor 515 can generate the output data packet by successively generating each data portion 920 (FIG. 9) of the sequence of data portions 920 in the sequential order. The method 1200 then proceeds to step 1225.

In step 1225, the output buffer 520 (FIG. 5) stores each data portion 920 of the sequence of data portions 920 successively in the sequential order. In one embodiment, the processor 515 (FIG. 5) writes each data portion 920 of the sequence of data portions 920 successively in the sequential order. The method 1200 then proceeds to step 1230.

In optional step 1230, the output buffer 520 (FIG. 9) outputs each data portion 920 (FIG. 9) of the sequence of data portions 920 to the packet framer 522 (FIG. 5) successively in the sequential order. The output buffer 520 can begin to output the data portions 920 stored in the output buffer 520 before all the data portions 920 of the sequence of data portions in the output data packet are stored in the output buffer 520 in step 1225. Further, the packet framer 522 can begin to output the data portions 920 of the output data packet to the output buffer 320 (FIG. 3) in the sequential order before all the data portions 920 of the sequence of data portions are stored in the output buffer 520. In this way, the latency of the packet switch 100 (FIG. 1) is reduced. The method 1200 then ends.

Although the invention has been described with reference to particular embodiments thereof, it will be apparent to one of the ordinary skill in the art that modifications to the described embodiment may be made without departing from the spirit of the invention. Accordingly, the scope of the invention will be defined by the attached claims not by the above detailed description.

What is claimed is:

1. A system for processing a data packet, the system comprising:
 a first data buffer comprising a first plurality of locations, the first data buffer configured to receive at least one input data packet comprising a plurality of data portions in a clock cycle comprising a plurality of subcycles by receiving a data portion of the plurality of data portions during each subcycle of the plurality of subcycles and to store each data portion of the plurality of data portions into a location of the first plurality of locations;

a second data buffer comprising a second plurality of locations, each location of the second plurality of locations configured to store a data portion;

a pointer table comprising a plurality of pointers configured to map the first plurality of locations to the second plurality of locations for avoiding a power spike; and a processor coupled to the first data buffer, the second data buffer, and the pointer table, the processor configured to generate an output data packet comprising a sequence of data portions having a sequential order, based on the plurality of data portions and the pointer table, the second data buffer further configured to store each data portion of the sequence of data portions into the second data buffer successively in the sequential order.

2. The system of claim 1, wherein the second data buffer is further configured to output each data portion of the sequence of data portions successively in the sequential order.

3. The system of claim 2, wherein the second data buffer is further configured to receive from the processor a first data portion of the sequence of data portions and a second data portion of the sequence of data portions, the second data buffer further configured to output the first data portion before receiving the second data portion.

4. The system of claim 1, wherein the processor is further configured to generate each data portion of the sequence of data portions successively in the sequential order.

5. A system for processing a data packet, the system comprising:

a first data buffer comprising a first plurality of locations, the first data buffer configured to receive at least one input data packet comprising a plurality of data portions in a clock cycle comprising a plurality of subcycles by receiving a data portion of the plurality of data portions during each subcycle of the plurality of subcycles and to store each data portion of the plurality of data portions into a location of the first plurality of locations;

a second data buffer comprising a second plurality of locations, each location of the second plurality of locations configured to store a data portion;

a pointer table comprising a plurality of pointers configured to map the first plurality of locations to the second plurality of locations;

a processor coupled to the first data buffer, the second data buffer, and the pointer table, the processor configured to generate an output data packet comprising a sequence of data portions having a sequential order, based on the plurality of data portions and the pointer table, the second data buffer further configured to store each data portion of the sequence of data portions into the second data buffer successively in the sequential order; and a cache memory coupled to the processor, wherein a first data portion of the plurality of data portions comprises a second data portion and a third data portion, the processor further configured to write the third data portion into the cache memory, generate a first data portion of the sequence of data portions based on the second data portion, access the third data portion in the cache memory, and generate a second data portion of the sequence of data portions based on the third data portion accessed in the cache memory.

6. The system of claim 5, wherein the processor is further configured to access the first data portion of the plurality of data portions in a first location of the first data buffer in a first clock cycle and to access the third data potion of the plurality of data portions in the cache memory in a second clock cycle following the first clock cycle.

7. The system of claim 6, wherein the pointer table comprises a plurality of pointers configured to map the first location of the first data buffer to a corresponding plurality of locations of the second data buffer.

8. A method of processing a data packet, the method comprising:

receiving at a first data buffer of a packet switch at least one input data packet comprising a plurality of data portions;

storing the plurality of data portions in a corresponding plurality of locations of the first data buffer;

mapping in a pointer table of the packet switch the plurality of locations of the first data buffer to a plurality of locations of a second data buffer of the packet switch for reducing power consumption;

generating by a processor of the packet switch an output data packet comprising a sequence of data portions having a sequential order, based on the plurality of data portions and the pointer table; and storing each data portion of the sequence of data portions in the second data buffer successively in the sequential order.

9. The method of claim 8, further comprising outputting each data portion of the sequence of data portions from the second data buffer successively in the sequential order.

10. The method of claim 9, further comprising receiving by the second data buffer a first data portion of the sequence of data portions and a second data portion of the sequence of data portions, wherein outputting each data portion of the sequence of data portions from the second data buffer successively in the sequential order comprises outputting the first data portion before receiving the second data portion.

11. The method of claim 8, wherein generating the output data packet comprising the sequence of data portions having the sequential order comprises generating each data portion of the sequence of data portions successively in the sequential order.

12. The method of claim 8, wherein receiving the at least one input data packet comprising the plurality of data portions comprises receiving the plurality of data portions in a clock cycle.

13. The method of claim 12, wherein the clock cycle comprises a plurality of subcycles, and wherein receiving the plurality of data portions in the clock cycle comprises receiving a data portion of the plurality of data portions during each subcycle of the plurality of subcycles.

14. A method of processing a data packet, the method comprising:

receiving at a first data buffer of a packet switch at least one input data packet comprising a plurality of data portions;

storing the plurality of data portions in a corresponding plurality of locations of the first data buffer;

mapping in a pointer table of the packet switch the plurality of locations of the first data buffer to a plurality of locations of a second data buffer of the packet switch for reducing power consumption;

generating by a processor of the packet switch an output data packet comprising a sequence of data portions having a sequential order, based on the plurality of data portions and the pointer table;

storing each data portion of the sequence of data portions in the second data buffer successively in the sequential order, wherein a first data portion of the plurality of data portions comprises a second data portion and a third data portion;

storing the third data portion of the plurality of data portions in a cache memory of the packet switch;

generating a first data portion of the sequence of data portions based on the second data portion of the plurality of data portions;

accessing the third data portion of the plurality of data portions in the cache memory; and generating a second data portion of the sequence of data portions based on the third data portion of the plurality of data portions accessed in the cache memory.

15. The method of claim 14, further comprising:

accessing the first data portion of the plurality of data portions in a first location of the first data buffer in a first clock cycle; and accessing the third data portion of the plurality of data portions in the cache memory in a second clock cycle following the first clock cycle.

16. The method of claim 15, wherein mapping the plurality of locations of the first data buffer to the plurality of locations of the second data buffer comprises mapping the first location of the first data buffer to a plurality of locations of the second data buffer.

17. The method of claim 8, wherein the plurality of locations of the first data buffer are mapped to the plurality of locations of the second data buffer to reduce latency.

18. A system for processing a data packet, the system comprising:

means for receiving at least one input data packet comprising a plurality of data portions;

means for storing the plurality of data portions in a corresponding plurality of locations of a first data buffer;

means for mapping the plurality of locations of the first data buffer to a second plurality of locations of a second data buffer to reduce power consumption;

means for generating an output data packet comprising a sequence of data portions having a sequential order, based on the plurality of data portions; and means for storing each data portion of the sequence of data portions into the second data buffer successively in the sequential order.

19. The method of claim 8, wherein mapping the plurality of locations of the first data buffer to the plurality of locations of the second data buffer to reduce power consumption comprises mapping the plurality of locations of the first data buffer to the plurality of locations of the second data buffer for avoiding a power spike.

20. The system of claim 18, wherein mapping the plurality of locations of the first data buffer to the second plurality of locations of the second data buffer to reduce power consumption comprises mapping the plurality of locations of the first data buffer to the plurality of locations of the second data buffer for avoiding a power spike.

21. The system of claim 18, wherein mapping the plurality of locations of the first data buffer to the second plurality of locations of the second data buffer to reduce power consumption comprises receiving the at least one input data packet comprising the plurality of data portions in a clock cycle comprising a plurality of subcycles by receiving a data portion of the plurality of data portions during each subcycle of the plurality of subcycles.

* * * * *

UNITED STATES PATENT AND TRADEMARK OFFICE
CERTIFICATE OF CORRECTION

PATENT NO.       : 7,817,652 B1
APPLICATION NO.  : 11/383150
DATED            : October 19, 2010
INVENTOR(S)      : MacAdam et al.

It is certified that error appears in the above-identified patent and that said Letters Patent is hereby corrected as shown below:

Column 5, line 15 "12C" should read --$I^2C$--.

Column 17, line 6 "100a" should read --1100a--.

Column 17, line 8 "100b" should read --1100b--.

Signed and Sealed this
Twenty-sixth Day of July, 2011

David J. Kappos
*Director of the United States Patent and Trademark Office*